US010087723B2

(12) United States Patent
Harris et al.

(10) Patent No.: US 10,087,723 B2
(45) Date of Patent: Oct. 2, 2018

(54) METHODOLOGY FOR BUILDING REALISTIC NUMERICAL FORWARD STRATIGRAPHIC MODELS IN DATA SPARSE ENVIRONMENT

(71) Applicants: Ashley D. Harris, Houston, TX (US); Tao Sun, Sugarland, TX (US); Martin A. Perlmutter, Houston, TX (US)

(72) Inventors: Ashley D. Harris, Houston, TX (US); Tao Sun, Sugarland, TX (US); Martin A. Perlmutter, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 438 days.

(21) Appl. No.: 14/977,823

(22) Filed: Dec. 22, 2015

(65) Prior Publication Data
US 2017/0175492 A1 Jun. 22, 2017

(51) Int. Cl.
G06F 17/10 (2006.01)
E21B 43/00 (2006.01)
(Continued)

(52) U.S. Cl.
CPC ............ E21B 43/00 (2013.01); G01V 99/005 (2013.01); G06F 17/18 (2013.01);
(Continued)

(58) Field of Classification Search
CPC ............ G06F 17/5018; E21B 49/00
(Continued)

(56) References Cited

U.S. PATENT DOCUMENTS 8,855,986 B2 * 10/2014 Castellini ............... G01V 99/00
703/10
9,514,096 B2 * 12/2016 Granjeon ................ G06F 17/10
(Continued)

FOREIGN PATENT DOCUMENTS

WO WO2013/092663 A2 6/2013

OTHER PUBLICATIONS

E. Albouy et al, "On the Fly" Stratigraphic Basin Modelling From Seismic Interpretation Workstations, International Petroleum Technology Conference, Nov. 21-23, Doha, Qatar, 2005 International Petroleum Technology Conference.
(Continued)

Primary Examiner — Andy Ho
(74) Attorney, Agent, or Firm — Marie L. Clapp

(57) ABSTRACT

Disclosed is a method and system for identifying simulated basin results and associated input parameter values for simulation of geographic basins by a stratigraphic forward model simulation program that are most likely to represent the actual basin by treating inputs and outputs of the stratigraphic forward model simulation program in a unified manner. An embodiment may calculate probability distributions for input parameters and validation data, and calculate likelihoods of simulated basins as a combination of the combination of the probabilities of the input parameters used to create the simulated basin and of the combination of the probabilities simulation validation results of the simulated basin. An embodiment may then select most likely simulation model result basins based on the results having a higher calculated likelihood. The most likely simulated basins may be used for analysis of exploration and/or production decisions without the need for additional, expensive testing on the actual basin.

23 Claims, 19 Drawing Sheets

(51) Int. Cl.
*G06F 17/18* (2006.01)
*G01V 99/00* (2009.01)

(52) U.S. Cl.
CPC ...... *G01V 2200/14* (2013.01); *G06F 2217/10* (2013.01); *G06F 2217/16* (2013.01)

(58) Field of Classification Search
USPC ...................................................... 703/2, 10
See application file for complete search history.

(56) References Cited

U.S. PATENT DOCUMENTS

| | | | |
|---|---|---|---|
| 2012/0221306 A1 | 8/2012 | Hurley et al. | |
| 2013/0132047 A1 | 5/2013 | Granjeon | |
| 2015/0081265 A1* | 3/2015 | Kauerauf | G06F 17/5009 703/10 |
| 2015/0226049 A1* | 8/2015 | Frangos | E21B 44/00 702/6 |
| 2017/0074997 A1* | 3/2017 | Pugh | G01V 1/288 |

OTHER PUBLICATIONS

Burgess et al, Stratigraphic Forward Modeling of Basin-Margin Clinoform Systems:Implications for Controls on Topset and Shelf Width and Timingof Formation of Shelf-Edge Deltas, Recent Advances in Models of Siliciclastic Shallow-Marine Stratigraphy SEPM Special Publication No. 90, Copyright © 2008.

Burgess et al, Regional Geology and Tectonics: Principles of Geologic Analysis—A brief review of developments in stratigraphic forward modeling 2000-2009; 2012.

Clark, S. R. et al., A Flexible Stochastic Approach to Constraining Uncertainty in Forward Stratigraphic Models, 18th World IMACS / MODSIM Congress, Cairns, Australia Jul. 13-17, 2009.

I. Csato et al., A three-dimensional stratigraphic model for the Messinian crisis in the Pannonian Basin, eastern Hungary, Article first published online: May 28, 2012, © 2012 The Authors. Basin Research © 2012 Blackwell Publishing Ltd, European Association of Geoscientists & Engineers and International Association of Sedimentologists.

Rory A.F.Dalman et al., SimClast: An aggregated forward stratigraphic model of continental shelves, Available onlineJun. 17, 2011, 2011Elsevier Ltd.

James Keith Miller et al., Direct Modeling of Reservoirs through Forward Process-based Models: Can We Get There?, International Petroleum Technology Conference, Dec. 3-5, Kuala Lumpur, Malaysia, 2008 International Petroleum Technology Conference.

Ahmad Nazhri Bin Mohd Zain et al., Linking Sequence Stratigraphy, Depositional Environment and Sedimentary Facies to Model the Sandstone 3D Architecture Within Palaeozoic Clastic Reservoirs, Saudi Arabia, 2008 Society of Petroleum Engineers.

PCT International Preliminary Report on Patentability re International Application No. PCT/US2016/056505, dated Jul. 5, 2018, pp. 1-10.

* cited by examiner

132 — WHEN CREATING THE PLURALITY OF FORWARD MODEL INPUT PARAMETER SETS, AN INPUT PARAMETER SET IS CREATED FOR SUBSTANTIALLY ALL INPUT PARAMETER COMBINATIONS WITHIN THE RANGES OF THE INPUT PARAMETERS (VIA, FOR EXAMPLE, MONTE CARLO SIMULATION AND/OR FREQUENCY DISTRIBUTION PLOTS)

130 FLOW CHART DETAIL FOR "ALL" PARAMETERS SETS CREATION FOR AN EMBODIMENT

FIG. 1B

142 — WHEN CREATING THE PLURALITY OF FORWARD MODEL INPUT PARAMETER SETS, CREATE AN INPUT PARAMETER SET ONLY FOR INPUT PARAMETERS DETERMINED BY A STANDARD OPTIMIZATION METHOD

140 FLOW CHART DETAIL FOR "OPTIMIZED" PARAMETERS SETS CREATION FOR AN EMBODIMENT

FIG. 1C

152 — SET THE RANGE OF EACH FORWARD MODEL INPUT PARAMETER AS A FUNCTION OF THE PROBABILITY DISTRIBUTION OF EACH FORWARD MODEL INPUT PARAMETER (FOR EXAMPLE, +/- 2σ)

154 — SET A SAMPLING STEP SIZE FOR OF EACH FORWARD MODEL INPUT PARAMETER FOR INCREMENTING VALUES OF EACH INPUT PARAMETER DURING CREATION OF THE PLURALITY OF FORWARD MODEL INPUT PARAMETER SETS AS A FRACTION OF THE RANGE OF EACH FORWARD MODEL INPUT PARAMETER

150 FLOW CHART DETAIL FOR AUTOMATIC SETTING OF INPUT PARAMETER RANGES & SAMPLING STEP SIZE FOR AN EMBODIMENT

FIG. 1D

162 — SET THE RANGE OF EACH FORWARD MODEL INPUT PARAMETER AS A USER DATA ENTRY

164 — SET A SAMPLING STEP SIZE FOR OF EACH FORWARD MODEL INPUT PARAMETER FOR INCREMENTING VALUES OF EACH INPUT PARAMETER DURING CREATION OF THE PLURALITY OF FORWARD MODEL INPUT PARAMETER SETS AS USER DATA ENTRY

160 FLOW CHART DETAIL FOR USER ENTRY SETTING OF INPUT PARAMETER RANGES & SAMPLING STEP SIZE FOR AN EMBODIMENT

FIG. 1E

172 — THE SELECTION OF AT LEAST ONE STRATIGRAPHIC SIMULATION MODEL RESULT AS MOST LIKELY AUTOMATICALLY SELECTS THE STRATIGRAPHIC SIMULATION MODEL RESULT WITH THE HIGHEST CALCULATED LIKELIHOOD

170 FLOW CHART DETAIL FOR SELECTING THE SIMULATION MODEL RESULT WITH THE HIGHEST LIKELIHOOD FOR AN EMBODIMENT

FIG. 1F

182 — THE SELECTION OF AT LEAST ONE STRATIGRAPHIC SIMULATION MODEL RESULT AS MOST LIKELY AUTOMATICALLY SELECTS A SUITE OF STRATIGRAPHIC SIMULATION MODEL RESULTS WITH LIKELIHOODS THAT EXCEED A PREDEFINED LIKELIHOOD THRESHOLD VALUE

184 — CALCULATE A PROBABILITY DISTRIBUTION FOR THE SUITE OF STRATIGRAPHIC SIMULATION MODEL RESULTS AS A FUNCTION OF THE CALCULATED LIKELIHOODS OF THE STRATIGRAPHIC SIMULATION MODEL RESULTS INCLUDED WITH THE SUITE OF STRATIGRAPHIC SIMULATION MODEL RESULTS
$(P_s(sim_k) = L(sim_k) / \Sigma_k L(sim_k))$ 180 FLOW CHART DETAIL FOR SELECTING A SUITE OF SIMULATION MODELS EXCEEDING A THRESHOLD FOR AN EMBODIMENT

FIG. 1G

SEDIMENT/WATER DISCHARGE RATE FORWARD MODEL INPUT PARAMETER
552

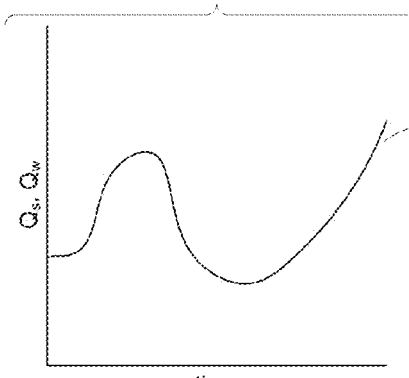

554 DERIVED SED/WATER DIS RATE
(based on relevant geologic data such as publications, databases, field data, etc.)

556 CALCULATE PROBABILISTIC DISTRIBUTION OF SED/WATER DIS RATE INPUT PARAMETER DATA

SEDIMENT/WATER DISCHARGE RATE PROBABILISTIC DISTRIBUTION

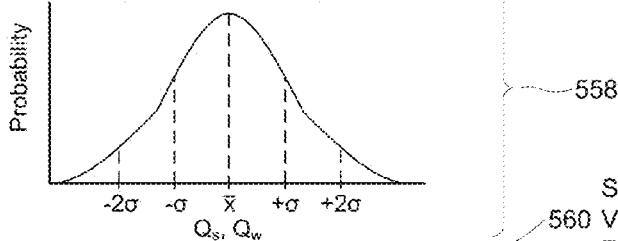

558

560 SET LIMITS/RANGE FOR VARYING SED/WATER DIS RATE INPUT PARAMETER

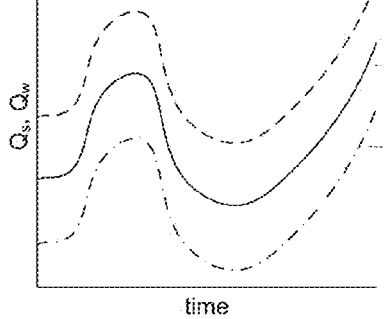

562 UPPER OF SED/WATER DISHARGE RATE LIMIT

554 DERIVED OF SED/WATER DIS RATE

564 LOWER OF SED/WATER DISCHARGE RATE LIMIT

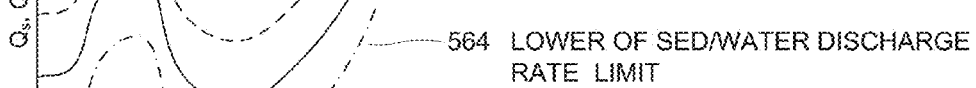

550 EXAMPLE PROBABILISTIC DISTRIBUTION FOR THE OF SEDIMENT/WATER DISCHARGE RATE FORWARD MODEL INPUT PARAMETER

FIG. 5C

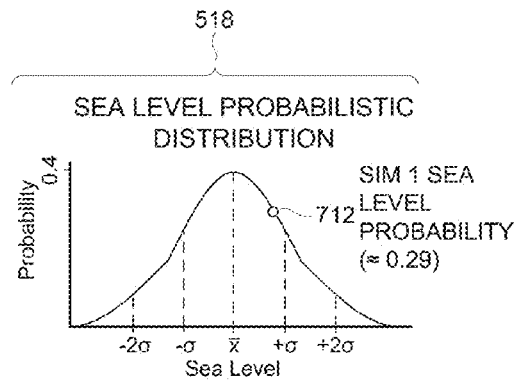
FIG. 7A
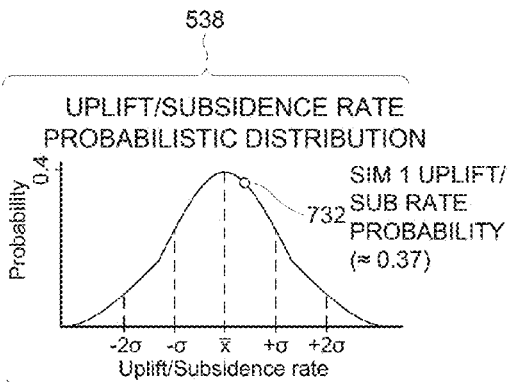
FIG. 7B
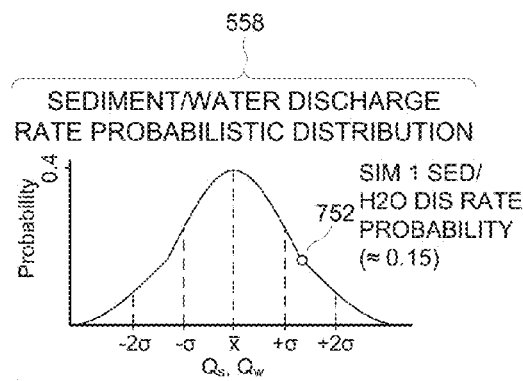
FIG. 7C
CALCULATION OF SIM 1 INPUT
PARAMS PROBABILITIES PRODUCT
772
$\prod_i G_i(a_i) \ (i = 1, ..., 3)$ — 774 INPUT PARAMS PROBS EQUATION
$= G_1(a_1) * G_2(a_2) * G_3(a_3)$
712 ↓ 732 752
$\prod_i G_i(a_i) = 0.29 * 0.37 * 0.15$
↓ SIM 1
$\prod_i G_i(a_i) = 0.016095$ — 776 PROBABILITIES PRODUCT
770 EXAMPLE SIMULATION RUN 1 PRODUCT OF FORWARD MODEL INPUT PARAMETER PROBABILITIES
FIG. 7D

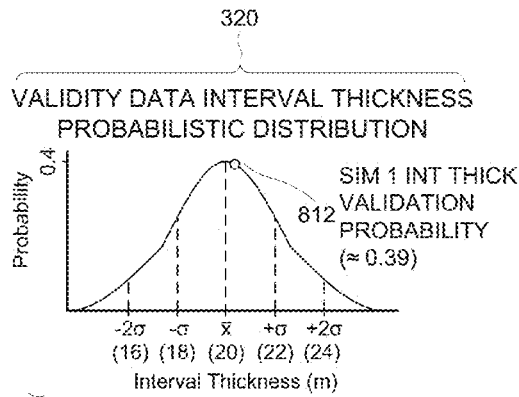

FIG. 8B

810 EXAMPLE SIM RUN 1 INTERVAL THICKNESS RESULT VAL = 20.4m VALIDATION DATA PROBABILITY DETERMINATION

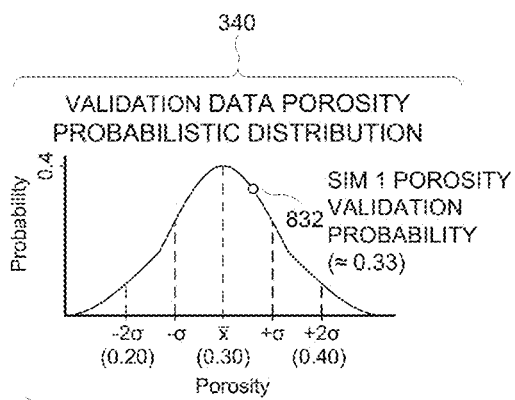

FIG. 8C

830 EXAMPLE SIM RUN 1 POROSITY RESULT VAL = 0.33 VALIDATION DATA PROBABILITY DETERMINATION

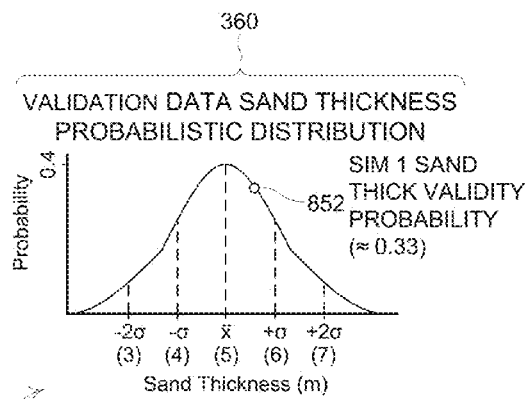

FIG. 8D

850 EXAMPLE SIM RUN 1 SAND THICKNESS RESULT VAL = 5.6m VALIDATION DATA PROBABILITY DETERMINATION

CALCULATION OF SIM 1 VALIDITY RESULTS PROBABILITIES PRODUCT 872

$$\prod_j P_j(v_j) \ (j = 1, \ldots, 3) = P_1(v_1) * P_2(v_2) * P_3(v_3)$$

874 VALIDITY RESULTS PROBS EQUATION $$\prod_j P_j(v_j) = 0.39 * 0.33 * 0.33$$

$$\prod_j P_j(v_j) = 0.042471$$

876 SIM 1 VALIDITY RESULT PROBABILITIES PRODUCT

870 EXAMPLE SIMULATION RUN 1 PRODUCT OF VALIDATION RESULTS PROBABILITIES

FIG. 8E

CALC OF SIM 1 LIKELIHOOD 902

$$L(sim_1) = \prod_i G_i(a_i) * \prod_j P_j(v_j)$$

874 SIM 1 LIKELIHOOD EQUATION $$L(sim_1) = 0.016095 * 0.042471 \longrightarrow L(sim_1) = 0.000683571$$

SIMULATION 1 LIKELIHOOD 910

900 EXAMPLE SIM RUN 1 LIKELIHOOD VALUE DETERMINATION

FIG. 9

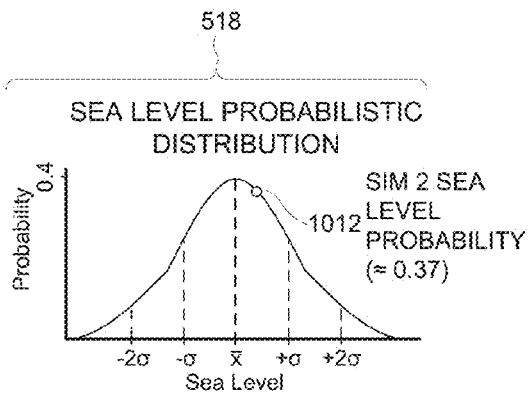

FIG. 10A — 1010 EXAMPLE SIMULATION RUN 2 SEA LEVEL PROBABILITY DETERMINATION

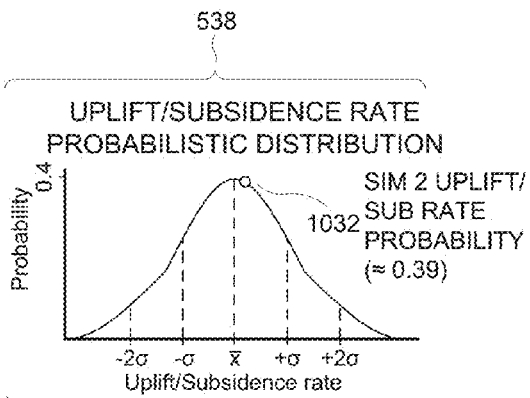

FIG. 10B — 1030 EXAMPLE SIMULATION RUN 2 TECTONIC UPLIFT/SUBSIDENCE RATE PROBABILITY DETERMINATION

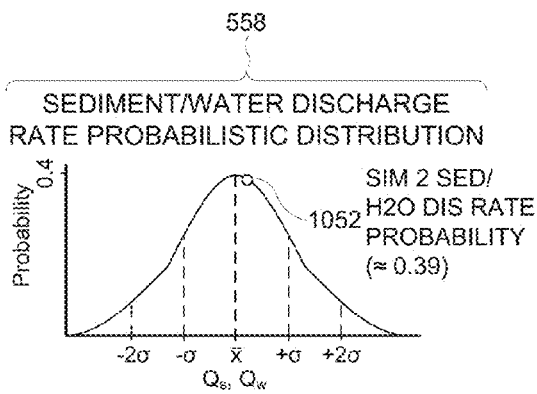

FIG. 10C — 1050 EXAMPLE SIMULATION RUN 2 SEDIMENT/WATER DISCHARGE RATE PROBABILITY DETERMINATION

CALCULATION OF SIM 2 INPUT PARAMS PROBABILITIES PRODUCT 1072

$\prod_i G_i(a_i)\ (i = 1, \ldots, 3)$ — 774 INPUT PARAMS PROBS EQUATION
$= G_1(a_1) * G_2(a_2) * G_3(a_3)$

1012 ↓ 1032  1052

$\prod_i G_i(a_i) = 0.37 * 0.39 * 0.39$

↓ SIM 2

$\prod_i G_i(a_i) = 0.056277$ — 1076 PROBABILITIES PRODUCT

FIG. 10D — 1070 EXAMPLE SIMULATION RUN 2 PRODUCT OF FORWARD MODEL INPUT PARAMETER PROBABILITIES

320

VALIDITY DATA INTERVAL THICKNESS
PROBABILISTIC DISTRIBUTION

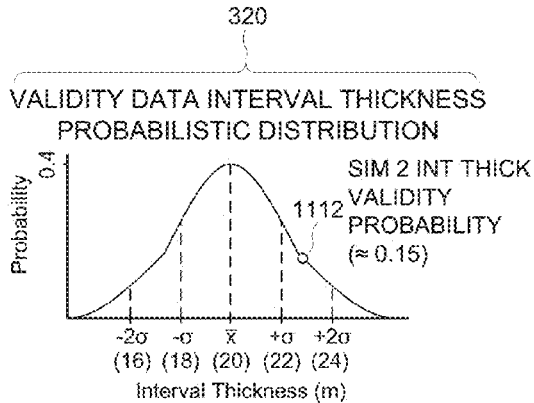

1110 EXAMPLE SIM RUN 2 INTERVAL
THICKNESS RESULT VAL = 22.8m
VALIDATION DATA PROBABILITY
DETERMINATION

VALIDATION DATA POROSITY
PROBABILISTIC DISTRIBUTION

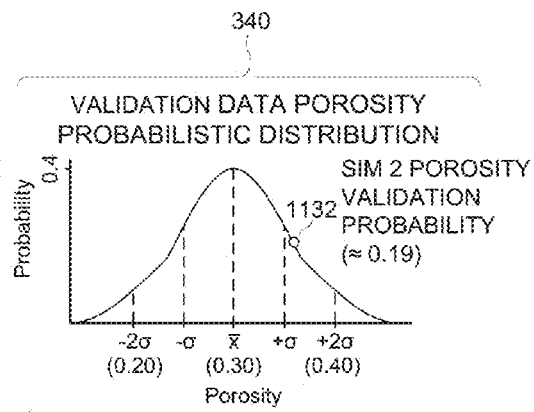

1130 EXAMPLE SIM RUN 2 POROSITY
RESULT VAL = 0.36 VALIDATION
DATA PROBABILITY
DETERMINATION

VALIDATION DATA SAND THICKNESS
PROBABILISTIC DISTRIBUTION

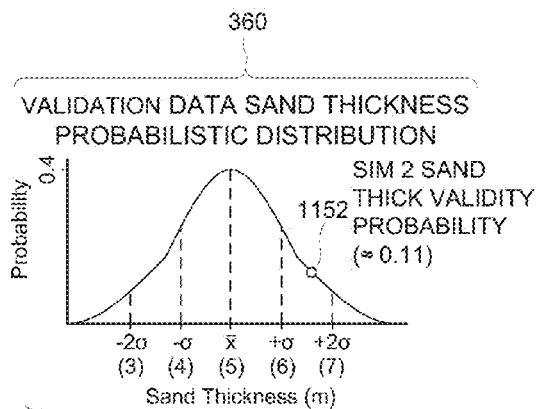

1050 EXAMPLE SIM RUN 2 SAND
THICKNESS RESULT VAL = 6.6m
VALIDATION DATA PROBABILITY
DETERMINATION

FIG. 11D

CALCULATION OF SIM 2 VALIDITY
RESULTS PROBABILITIES PRODUCT
1172

$$\prod_j P_j(v_j)\ (j = 1, ..., 3)\quad \text{874 VALIDITY RESULTS PROBS EQUATION}$$
$$= P_1(v_1) * P_2(v_2) * P_3(v_3)$$

1112 ↓ 1132  1152

$$\prod_j P_j(v_j) = 0.15 * 0.19 * 0.11$$

↓  1176 SIM 1 VALIDITY RESULT PROBABILITIES PRODUCT $$\prod_j P_j(v_j) = 0.003135$$

1170 EXAMPLE SIMULATION RUN 2
PRODUCT OF VALIDATION
RESULTS PROBABILITIES

FIG. 11E

CALC OF SIM 2 LIKELIHOOD 1202

$$L(sim_2) = \prod_i G_i(a_i) * \prod_j P_j(v_j)\quad \text{1274 LIKELIHOOD EQUATION}$$

1076 ↓   ↓ 1176

$$L(sim_2) = 0.056277 * 0.003135 \longrightarrow L(sim_2) = 0.000176428$$

SIMULATION 2
LIKELIHOOD
1210

1200 EXAMPLE SIM RUN 2 LIKELIHOOD VALUE DETERMINATION

FIG. 12

METHODOLOGY FOR BUILDING REALISTIC NUMERICAL FORWARD STRATIGRAPHIC MODELS IN DATA SPARSE ENVIRONMENT

BACKGROUND OF THE INVENTION

Sedimentology is the study of sedimentary rocks that are generally formed by: the deposition of rock fragments which have been transported from their source to another location by water or air (sandstone and shale), precipitation from a liquid or solution (salt, gypsum), and remains (shells, skeletons and organic matter) of organisms (limestone, coal). Sedimentary rocks are deposited in layers known as strata. Stratigraphy is the study of the origin, composition, distribution and succession of these strata. Modeling programs, particularly forward stratigraphic modeling programs, may assist the study of the stratigraphy of a particular area by creating a model of a particular basin that may be used to more closely study the basin than would be possible and/or economically feasible using solely direct measurements of the characteristics of the basin.

Oil and gas reservoirs as well as groundwater resources occur in sedimentary basins filled with strata of diverse compositions that contain fluids (water, oil, gas) in variable proportions and spatial distributions. The distribution of fluids is strongly controlled by petrophysical (e.g., porosity and permeability) and geometric (e.g., continuity and connectivity) properties of strata.

To recover petroleum from these reservoirs typically requires drilling through thousands of feet of overlying rock. The drilling of oil and gas wells is typically a very expensive endeavor. Accordingly, before incurring such a large expense, those involved in the exploration and production of oil and gas reservoirs normally seek to obtain an understanding of the basin geology and, in particular, the basin sedimentology and stratigraphy so that an oil/gas well is drilled in a location that is likely to achieve the desired result. In the case of oil and gas exploration, geologic and seismic data are used to predict the location of sedimentary rocks and structures that are likely to contain an oil/gas reservoir. With respect to developing an oil/gas reservoir, geologic and seismic data are used to predict locations for drilling wells that will facilitate the extraction of additional oil from a reservoir.

Currently, there are many different techniques available for obtaining sedimentologic and stratigraphic data. One technique is seismic surveying, which involves: transmitting sound waves from the surface into the earth, recording the waves that are reflected back to the surface when the transmitted wave encounters interfaces between strata, fractures and the like in the underlying earth, and analyzing the reflected signals to make geological inferences about sedimentary rocks and fluids encountered by the waves as they propagate through the earth. Other techniques that are also used are coring and well logging, which involve taking samples of the various rocks and fluids encountered as a well is drilled, noting the extent of each particular kind of rock that is encountered during the drilling, and inserting various instruments into the well that measure various rock and fluid properties, such as porosity. These techniques obtain direct and indirect information only at the coring or well sites. Most of the techniques for obtaining sedimentologic and sedimentary data are relatively expensive and are limited to the locations in which the data are taken, i.e., the data obtained by one of these techniques at a particular location are not representative of the underlying geology for more than a short distance away from the location at which the data were taken. As a consequence, any conclusions drawn with respect to sedimentological and sedimentary attributes are subject to increasing uncertainty as the location of interest becomes increasingly remote from the locations at which the data are taken. However, even when only sparse (i.e., potentially uncertain) direct data on a location is available, those involved may wish to obtain some type of additional reassurance that extractable material is available in a location before investing in expensive additional testing and/or drilling procedures for a particular location.

SUMMARY OF THE INVENTION

An embodiment of the present invention may comprise a computerized method performed by a computer system to automatically select most likely simulated basin results produced by a user selected stratigraphic forward model simulation program as a function of available geologic data used to derive a plurality of forward model input parameters for the stratigraphic forward model simulation program and available observed measurements of the actual basin used to derive a plurality of validation data values of the actual basin, the method comprising: calculating by the computer system a probability distribution for each of the plurality of validation data values; calculating by the computer system a probability distribution for each of the plurality of forward model input parameters; creating by the computer system a plurality of forward model input parameter sets by varying each of the plurality of forward model input parameters within a range of each of the plurality of forward model input parameters such that each of the plurality of forward model input parameter sets is unique from other forward model input parameter sets within the plurality of forward model input parameter sets; executing by the computer system the stratigraphic forward model simulation program with each forward model parameter set of the plurality of forward model parameter sets in order to obtain a plurality of stratigraphic simulation model results such that each stratigraphic simulation model result of the plurality of stratigraphic simulation model results is uniquely associated with the forward model input parameter set of the plurality of forward model input parameter sets used to obtain each stratigraphic simulation model result; evaluating by the computer system each stratigraphic simulation model result of the plurality of stratigraphic simulation model results to obtain a plurality of simulation validation data values for each stratigraphic simulation model result at a location on each stratigraphic simulation model result comparable to the plurality of validation data values of the actual basin; determining by the computer system probabilities for each simulation validation data value of each of the plurality of simulation data values for each stratigraphic simulation model result of the plurality of simulation model results based on the calculated probability distribution of each comparable validation data value of the plurality of validation data values of the actual basin; determining by the computer system probabilities for each forward model input parameter of the plurality of forward model input parameters of each forward model input parameter set of the plurality of forward model input parameter sets associated with each stratigraphic simulation model result of the plurality of the stratigraphic simulation model results based on the calculated probability distribution of each forward model input parameter of the plurality of forward model input parameters; calculating by the computer system a simulation model result likelihood for each stratigraphic simulation model result of the plurality of stratigraphic simulation model results, by combining together the determined probabilities of the plurality of forward model input parameters of the forward model input parameter set associated with each stratigraphic simulation model result to obtain a combination of forward model input parameter probabilities for each stratigraphic simulation model result, combining together the probabilities of the plurality of simulation validation data values associated with each stratigraphic simulation model result to obtain a combination of simulation validation data value probabilities for each stratigraphic simulation model result, and then combining the combination of forward model input parameter probabilities with the combination of simulation validation data value probabilities for each stratigraphic simulation model result to obtain the simulation model result likelihood for each stratigraphic simulation model result; and selecting automatically by the computer system at least one stratigraphic simulation model result and associated forward model input parameter set as most likely as a function of the at least one stratigraphic simulation model result having a higher simulation model result likelihood than other stratigraphic simulation model results of the plurality stratigraphic simulation model results.

An embodiment of the present invention may further comprise a simulated basin result selection computer system that automatically selects most likely simulated basin results produced by a user selected stratigraphic forward model simulation program based as a function of available geologic data used to derive a plurality of forward model input parameters for the stratigraphic forward model simulation program and available observed measurements of the actual basin used to derive a plurality of validation data values of the actual basin, the simulated basin result selection computer system comprising: a computer system, the computer system control and management function operation directed by computer instructions of an application operating on the computer system such that the computer system directed by the application further comprises: a validation data probability distribution calculation subsystem that calculates a probability distribution for each of the plurality of validation data values; a forward model input parameter probability distribution calculation subsystem that calculates a probability distribution for each of the plurality of forward model input parameters; a forward model input parameter set creation subsystem that creates a plurality of forward model input parameter sets by varying each of the plurality of forward model input parameters within a range of each of the plurality of forward model input parameters such that each of the plurality of forward model input parameter sets is unique from other forward model input parameter sets within the plurality of forward model input parameter sets; a stratigraphic forward model simulation program execution subsystem that executes the stratigraphic forward model simulation program with each forward model parameter set of the plurality of forward model parameter sets in order to obtain a plurality of stratigraphic simulation model results such that each stratigraphic simulation model result of the plurality of stratigraphic simulation model results is uniquely associated with the forward model input parameter set of the plurality of forward model input parameter sets used to obtain each stratigraphic simulation model result; a stratigraphic simulation model result evaluation subsystem that evaluates each stratigraphic simulation model result of the plurality of stratigraphic simulation model results to obtain a plurality of simulation validation data values for each stratigraphic simulation model result at a location on each stratigraphic simulation model result comparable to the plurality of validation data values of the actual basin; a simulation validation data value probability determination subsystem that determines probabilities for each simulation validation data value of each of the plurality of simulation data values for each stratigraphic simulation model result of the plurality of simulation model results based on the calculated probability distribution of each comparable validation data value of the plurality of validation data values of the actual basin; a simulation forward model input parameter probability determination subsystem that determines probabilities for each forward model input parameter of the plurality of forward model input parameters of each forward model input parameter set of the plurality of forward model input parameter sets associated with each stratigraphic simulation model result of the plurality of the stratigraphic simulation model results based on the calculated probability distribution of each forward model input parameter of the plurality of forward model input parameters; a simulation model result calculation subsystem that calculates a simulation model result likelihood for each stratigraphic simulation model result of the plurality of stratigraphic simulation model results, by combining together the determined probabilities of the plurality of forward model input parameters of the forward model input parameter set associated with each stratigraphic simulation model result to obtain a combination of forward model input parameter probabilities for each stratigraphic simulation model result, combining together the probabilities of the plurality of simulation validation data values associated with each stratigraphic simulation model result to obtain a combination of simulation validation data value probabilities for each stratigraphic simulation model result, and then combining the combination of forward model input parameter probabilities with the combination of simulation validation data value probabilities for each stratigraphic simulation model result to obtain the simulation model result likelihood for each stratigraphic simulation model result; and a most likely stratigraphic simulation model result selection subsystem that automatically selects at least one stratigraphic simulation model result and associated forward model input parameter set as most likely as a function of the at least one stratigraphic simulation model result having a higher simulation model result likelihood than other stratigraphic simulation model results of the plurality stratigraphic simulation model results.

BRIEF DESCRIPTION OF THE DRAWINGS

In the drawings,

FIG. 1B is a flow chart detail for an embodiment that creates a forward model input parameter set for substantially all permutations of forward model input parameters within the limits/ranges of the forward model inputs.

FIG. 1C is a flow chart detail for an embodiment that creates a forward model parameter set based on a standard optimization method.

FIG. 1D is a flow chart detail for an embodiment that automatically sets forward model input parameter ranges and sampling step sizes.

FIG. 1E is a flow chart detail for an embodiment that sets forward model input parameter ranges and sampling step sizes by user data entry.

FIG. 1F is a flow chart detail for an embodiment that selects as most likely the simulation model result with a highest calculated simulation model result likelihood.

FIG. 1G is a flow chart detail for an embodiment that selects as most likely a suite of simulation model results that have a calculated simulation model result likelihood that exceeds a predefined threshold.

FIG. 5C is an illustration of the progression in the creation of a probabilistic distribution for an example sediment/water discharge rate forward model input parameter.

FIG. 7A is an illustration of determining the probability for a particular first example sea level forward model input parameter.

FIG. 7B is an illustration of determining the probability for a particular first example tectonic uplift/subsidence rate forward model input parameter.

FIG. 7C is an illustration of determining the probability for a particular first example sediment/water discharge rate forward model input parameter.

FIG. 7D is an illustration of the progression in the calculation of a product of probabilities for a first example forward model input parameter set.

FIG. 8B is an illustration of determining the probability for a particular first example interval thickness simulation validation data value.

FIG. 8C is an illustration of determining the probability for a particular first example porosity simulation validation data value.

FIG. 8D is an illustration of determining the probability for a particular first example sand thickness simulation validation data value.

FIG. 8E is an illustration of the progression in the calculation of a product of probabilities for a first example plurality of simulation validation values.

FIG. 9 is an illustration of the progression in the calculation of a likelihood for a first example simulated model result basin.

FIG. 10A is an illustration of determining the probability for a particular second example sea level forward model input parameter.

FIG. 10B is an illustration of determining the probability for a particular second example tectonic uplift/subsidence rate forward model input parameter.

FIG. 10C is an illustration of determining the probability for a particular second example sediment/water discharge rate forward model input parameter.

FIG. 10D is an illustration of the progression in the calculation of a product of probabilities for a second example forward model input parameter set.

FIG. 11B is an illustration of determining the probability for a particular second example interval thickness simulation validation data value.

FIG. 11C is an illustration of determining the probability for a particular second example porosity simulation validation data value.

FIG. 11D is an illustration of determining the probability for a particular second example sand thickness simulation validation data value.

FIG. 11E is an illustration of the progression in the calculation of a product of probabilities for a second example plurality of simulation validation values.

FIG. 12 is an illustration of the progression in the calculation of a likelihood for a second example simulated model result basin.

DETAILED DESCRIPTION OF THE EMBODIMENTS

Figure 1A:
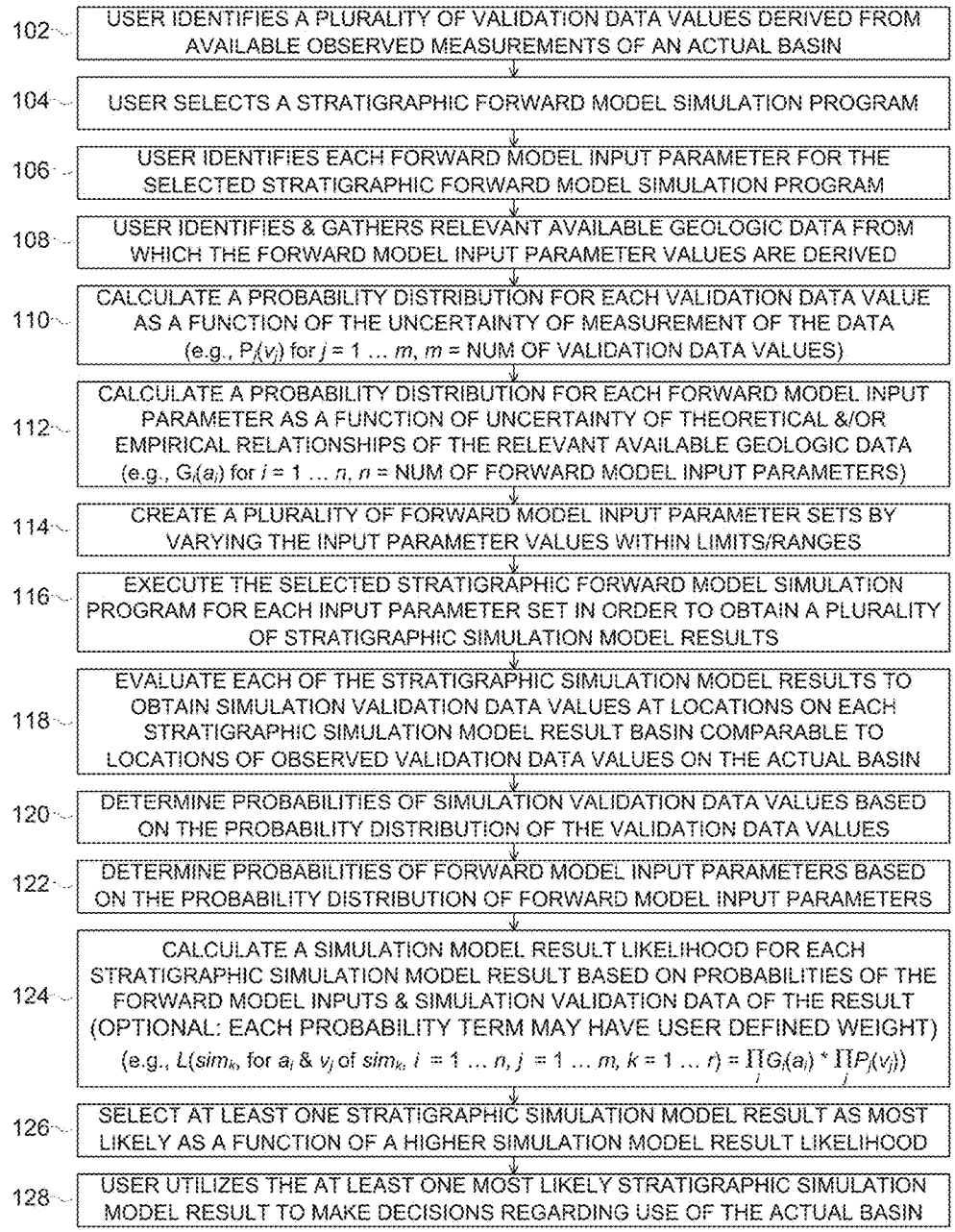
FIG. 1A is a flow chart of the operation of an embodiment.

Forward stratigraphic modeling simulation programs are tools designed to numerically simulate the processes of sediment transport and deposition in either or both 2-Dimensional (2D) or 3-Dimensional (3D) representations. Besides the processes or algorithms that are used in the simulation software, the boundary conditions or values for an input parameter have a significant bearing on the output of the model simulation result. A major challenge in applying numerical stratigraphic modeling simulation to a given sedimentary system is constraining the values for a given input parameter.

One technique to constrain the values for a given input parameter may be to run a large range of values for the input parameter and iterate until the simulation model result fits the desired results. The desired results are typically data that is observed and/or derived from actual test measurements in the field of the actual basin being simulated/modeled. The observed and/or derived data from field measurements of the actual basin may also be referred to as validation or verification data as the observed field data may be used to validate or verify the simulation model results of the forward model simulation program. Further, as the process of constraining the values of the forward model input parameters may be referred to as "conditioning" the simulation model, the observed and/or derived data from field measurements may also be referred to as conditioning data. To avoid confusion with other concepts of "conditioning," the desired results (i.e., observed and/or derived data from field measurements of the actual basin) will, herein, be referred to as validation data.

Unfortunately, when constraining the values of a given input parameter by running a large range of values for the input parameter and comparing the simulation model result to the validation data, quite often there is not a sufficient amount of validation data, or the validation data has a high degree of uncertainty such that the approach of running a large range of values for the input parameters can be problematic. The process of running a large range of values for the input parameters is problematic with respect to truly understanding controls on a depositional system because the input parameter values that lead to the best fit of a few uncertain validation data may not only insufficiently constrain the model to the real world actual basin being modeled/simulated, but also could be misleading by placing a disproportionally large amount of weight on so called "best match" scenarios. Placing too much weight on the best match scenarios could, in turn, skew the probability analysis of the distribution of various simulation model results and, consequentially, renders the simulation model results and uncertainty analysis less effective.

Ultimately, the approach of running a large range of values and iterating until the simulation model results conditions the input parameters solely against the desired results (i.e., validation data of the observed and/or derived data from measurements of the actual basin collected in the field). When there is a substantial amount of reliable field data collected for a basin, validating (i.e., conditioning) the simulation model result against the validation data will likely yield a high quality, reliable simulation model result. When validation data is sparse and/or has statistically significant uncertainty, it is less likely that simply validating against the validation data will produce the high quality, reliable simulation model results that are desired and needed to make research and production decisions for a particular basin.

Another technique to constrain the forward model input parameters of the stratigraphic model simulation programs that avoids the uncertainty and/or sparseness of validation data is to look solely at the uncertainty of the value of the input parameters themselves without attempting to match the results of the stratigraphic model with the validation data of field measurements of the actual basin. The approach of constraining the forward model input parameters based on the reliability and/or uncertainty of the value of the input parameters themselves takes into account accepted geologic theoretical and/or empirical relationships of available geologic data without constraining the input parameter values to potentially sparse and/or unreliable/uncertain validation data. Unfortunately, the technique of constraining the forward model input parameters based on the reliability and/or uncertainty of the value of the input parameters themselves lacks any direct, or even indirect, connection with the actual basin being simulated/modeled.

Various embodiments of the present invention may provide a fundamentally new and novel technique of conditioning forward stratigraphic simulation models. Instead of trying to find a best conditioned model where the simulation models produced by the simulation program are selected based on the criteria of whether the simulation model results match the validation (i.e., conditioning) data of the available observed measurements of the actual basin, such as well logs, cores, and/or seismic lines if they are available, the technique of the various embodiments may allow identification of one or a suite of simulation model results that are most consistent with all the data that is available in the field, including hard and soft data that are related to the input parameter conditions that the forward model simulation program may operate under. Hence, the various embodiments may select and constrain a range of values for forward model input parameters that is able to utilize the available data that is geologically most reasonable for the parameter inputs as well as also being representative of the validation data available associated with the actual basin being simulated. In other words, the various embodiments may treat inputs to and outputs of the stratigraphic forward model simulation program in a unified manner, rather than treating the inputs and outputs separately.

The various embodiments implementing the unified input/output technique described herein may be particularly useful in basin modeling when applied to frontier explorations where there are few actual measured data from the actual basin available, and often what data is available comes with high uncertainties. In sparse and/or high uncertainty of actual measured data situations, the various embodiments may be able to provide a general frame work for putting all the available data in context, and make a globally optimized analysis and a geologically realistic uncertainty assessment. Thus, the various embodiments may provide a selection of one or more most likely simulation model result of a basin that will permit effective analysis of the basin for exploration and/or production decisions without the need to perform additional, expensive testing procedures on the actual basin.

FIG. 1A is a flow chart 100 of the operation of an embodiment. At process 102, a user identifies a plurality of data values from available actual observed test measurements or from information derived from the available actual observed test measurements of the actual basin that is to be simulated. While it may also be possible to automate the identification of the validation data values using a variety of techniques such as the embodiment searching through databases for observed data of the actual basin being simulated/modeled, such automation is not necessary for an embodiment so long as validation data are identified as such to the embodiment. Examples of available actual observed test measurements or information derived from the available actual observed test measurements of the actual basin that is to be simulated may include, but are not limited to: collected seismic data of the actual basin (either or both of 2D and 3D seismic data), collected well log data of the actual basin, collected core data of the actual basin, collected outcrop data of the actual basin, interval thickness data derived for the actual basin, depositional environment data derived for the actual basin, geometry data derived for the actual basin, reservoir property data derived for the actual basin, age data derived for the actual basin, and sedimentation rate derived for the actual basin. The validation data values may include particular data values that may be defined for particular sections/locations of a basin commensurate with the location of the test measurements taken from which the validation data values are observed or derived. Example validation data values may include, but are not limited to: interval thickness values, depositional environment values, basin geometry values, reservoir property values, basin age values, and/or sedimentation rate values.

At process 104, the user selects a stratigraphic forward model simulation program. As with the above described user selections/identifications, while it may also be possible to automate the selection of the stratigraphic forward model simulation program using a variety of techniques such as randomly selecting from a list of available stratigraphic forward model simulation programs, such automation is not necessary for an embodiment so long as a stratigraphic forward model simulation program is selected as such for the embodiment. Examples of potential stratigraphic forward model simulation programs include, but are not limited to: DIONISOS, SEDSIM, SEDPAK, and CSDMS (Community Surface Dynamics Modeling System).

At process 106, the user identifies each forward model input parameter for the selected stratigraphic forward model simulation program as a plurality of forward model input parameters. Again, as with the above described user selections/identifications, while it may also be possible to automate the identification of the forward model input parameters, particularly for a selected stratigraphic forward model simulation program known to an embodiment, using a variety of techniques such as the embodiment having a predefined list of forward model input parameters necessary for each potential stratigraphic forward model simulation program, such automation is not necessary for an embodiment so long as the forward model input parameters are identified as such to the embodiment. Examples of forward model input parameters may include, but are not limited to: sea level, water supply, sediment and water supply discharge rate, tectonic uplift/subsidence rate, and compaction.

At process 108, the user identifies and gathers the relevant geologic data from which the forward model input parameter values are to be derived. Once again, as with the above described user selections/identifications, while it may also be possible to automate the identification and gathering of the relevant available geologic data applicable to the forward model input parameters using a variety of techniques such as the embodiment searching through databases for the relevant geologic data of the forward model input parameters, such automation is not necessary for an embodiment so long as the relevant geologic data is gathered and identified as such to the embodiment. The relevant geologic data may be data specific the actual basin being simulated/modeled, or the relevant geologic data may be generally applicable data for geologic features of similar basins. Examples of relevant geologic data may include, but are not limited to: geologic data in databases, geochemical in databases, tectonic in databases, geomorphologic data in databases, biostratigraphy in databases, regional geology data in databases, field measurements of said actual basin, sea level curve data, water supply data, sediment and water supply discharge rate data, tectonic uplift/subsidence rate data, and compaction data.

Processes 110-126 shown in FIG. 1A for an embodiment are automated and performed by a computer system A computer system is necessary for the evaluation of the system by an embodiment due to the typically large number and required precision of the mathematical computations for probabilities, likelihoods, and the execution of the stratigraphic forward model simulation program to create a typically sizeable number (potentially in the hundreds, or possibly even thousands) of simulated model basins created during typical processing for an embodiment. Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. The computer instructions, in whole or in part, may be implemented as software to cause specific operation of a general purpose computer system. The computer instructions, in whole or in part, may be implemented as firmware on a task specific electronic device. A computer system or electronic device may be comprised, in whole or in part, of a general purpose computer system with a Central Processing Unit (CPU), memory and other hardware systems that implement computer instructions. Likewise, a computer system may be comprised, in whole or in part, of application specific logic hardware including, but not limited to, an Application Specific Integrated Circuit (ASIC) or a Field Programmable Gate Array (FPGA). Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

At process 110, an embodiment calculates a probability distribution for each validation data value of the plurality of validation data values. The probability distribution may be calculated using any statistically relevant probability measure and distribution for each validation data value. For instance, the probability distribution may be a typical Normal or Gaussian probability distribution, but other types of probability distributions may be utilized if it is determined that a different probability distribution is more applicable to a particular validation data value. The probability distribution for each validation data value is typically calculated as a function of the uncertainty of the test measurement of the actual basin from which each validation value is observed or derived. There is a separate probability distribution calculated for each validation data value. Accordingly, Eq. 1 may represent the probability distributions for the validation data values, where P represents the probability distribution of each validation data value, v represents the validation data value, j represents the index number of validation data values, and m represents the total number of validation data values.

$$P_j(v_j) \text{ for } j=1 \ldots m \qquad \text{Eq. 1}$$

At process 112, an embodiment calculates a probability distribution for each forward model input parameter of the plurality of forward model input parameters. As with the probability distributions calculations for the validation data values, the probability distribution may be calculated using any statistically relevant probability measure and distribution for each forward model input data parameter, including the typical Normal probability distribution as well as other probability distributions. The probability distribution for each forward model input parameter of uncertainty of the theoretical and/or empirical relationships relevant to the geologic data used to derive/obtain the values of the forward model input parameters. There is a separate probability distribution calculated for each forward model input parameter. Accordingly, Eq. 2 may represent the probability distributions for the forward model input parameters, where G represents the probability distribution of each forward model input parameter, a represents the forward model input parameter, i represents the index number of forward model input parameters, and n represents the total number of forward model input parameters.

$$G_i(a_i) \text{ for } i=1 \ldots n \qquad \text{Eq. 2}$$

At process 114, an embodiment creates a plurality of forward model input parameter sets by varying the forward model input parameter values within geologically reasonable limits/ranges. Geologically reasonable would mean that for each forward model input parameter, the value of the forward model input parameter cannot fall outside of what is accepted as geologically reasonable. For instance, having a sea level measurement that is significantly outside of a well accepted range of sea levels determined for the entirety of geologic history (or even history of the sedimentary layers known to be at the particular real world actual basin being simulated/modeled), would not be a geologically reasonable sea level. A user, using the expertise of the user or other experts consulted by the user, may determine what is geologically reasonable and enter the limits/range of each forward model input parameter manually by user data entry. An embodiment may also automatically set the limits/range each forward model input parameter. For instance, an embodiment may calculate the limits/range of each forward model input parameter as a function of the calculated probability distribution of each forward model input parameter (e.g., +/− two standard deviations, +/−2σ) from process 112 described in more detail above. Various embodiments may mix automatic and user data entry limits/ranges between different forward model input parameters, and may even set the upper and lower limits as one from data entry and one from an automatic setting for a particular forward model input parameter such that the limits/range for the particular forward model input parameter is determined as a combination of manual data entry by the user and automatic determination by the embodiment. The plurality of forward model input parameter sets should be unique in that no two forward model input parameter sets have the same values for all forward model input parameters. However, repetition of some individual forward model input parameter values is expected and may be desirable. For instance, two acceptable forward model input parameter sets might be a set of the values (1, 2, 3) and (1, 2, 4), where the (1, 2) values are the same between the two forward model input parameter sets, but the (3) and (4) values that differ between the two forward model parameter sets make the forward model input parameter sets unique from each other. The plurality of forward model parameter sets for an embodiment should provide a geologically reasonable representation of the ranges of the forward model input parameters. A system may attempt to obtain substantially all of the input parameter sets using a Monte Carlo simulation and/or frequency distribution plots within the limits/ranges for each forward model input parameter. Another embodiment may attempt to limit the number of forward model input parameter sets by using a standard optimization method to attempt to narrow the forward model parameter sets to only forward model input parameter sets that satisfy the standard optimization method. By limiting the number of forward model parameter sets, an embodiment may also limit the number of executions of the stratigraphic forward model simulation program at process 116 described in more detail below.

At process 116, an embodiment executes the selected stratigraphic forward model simulation program for each forward model input parameter set to create an associated plurality of stratigraphic simulation model basin results (i.e., simulated or model basins representative of the actual basin being investigated).

At process 118, an embodiment evaluates each of the plurality of stratigraphic simulation model basin results to obtain simulation validation values at locations on each stratigraphic simulation model basin result comparable to the locations of the observed validation data values on the actual basin as identified in process 102.

At process 120, an embodiment determines the probabilities for each of the simulation validation values for each of the plurality of stratigraphic simulation model results based on the associated probability distribution of the comparable validation data value calculated at process 110. An embodiment may determine the probability of each simulated validation data value by locating each simulated validation data value on the associated probability distribution curve of the validation data value and then determining the probability at the simulated validation data value on the probability distribution curve.

Similarly at process 122, an embodiment determines the probabilities for each of the forward model input parameter values used to create each of the plurality of stratigraphic simulation model results based on the associated probability distribution of the forward model input parameters calculated at process 112. An embodiment may determine the probability of each forward model input parameter value by locating each forward model input parameter value on the associated probability distribution curve of the forward model input parameter and then determining the probability at the forward model input parameter value on the probability distribution curve.

At process 124, an embodiment calculates a simulation model result likelihood for each stratigraphic simulation model result (and, likewise, for the associated forward model input parameter set used to create each stratigraphic simulation model result) based on the probabilities of the forward model input parameters determined in process 122 and the probabilities of the simulation validation data values determined in process 120 that are associated with each stratigraphic simulation model result. For an embodiment, the simulation model result likelihood for each stratigraphic simulation model result may be calculated as a product of the products of the probabilities of the forward model input parameters and the product of the probabilities of the simulation validation data values that are associated with each stratigraphic simulation model result (see, for example, Eq. 3 below). Similarly, for another embodiment, the simulation model result likelihood for each stratigraphic simulation model result may be calculated as a sum of the sums of the probabilities of the forward model input parameters and the sums of the probabilities of the simulation validation data values that are associated with each stratigraphic simulation model result (see, for example, Eq. 4 below). Other embodiments may further choose combinations using a mixture of additive summations and multiplicative products (see, for example, Eqs. 5-10 below). A simulation model result likelihood is calculated for each stratigraphic simulation model result such that there is a plurality of simulation model results with a one-to-one association with the plurality of stratigraphic simulation model results. Accordingly, Eqs. 3-10 may represent the plurality of simulation model result likelihood calculations for the plurality of stratigraphic simulation model results and associated forward model input parameter sets, where P represents the probability distribution of each simulation validation data value of each simulation validation data value in a plurality of simulation validation values associated with each stratigraphic simulation model result, v represents the simulation validation data value, j represents the index number of simulation validation data values, m represents the total number of simulation validation data values, G represents the probability distribution of each forward model input parameter in a forward model input parameter set associated with each stratigraphic simulation model result, a represents the forward model input parameter, i represents the index number of forward model input parameters, n represents the total number of forward model input parameters, k represents the index number of stratigraphic simulation model results, and r represents the total number of stratigraphic simulation model results.

$$L(\text{sim}_k, \text{ for } a_i \& v_j \text{ of sim}_k, \text{ for } i=1 \ldots n, j=1 \ldots m, k=1 \ldots r) = \Pi_i G_i(a_i) \times \Pi_j P_j(v_j) \quad \text{Eq. 3}$$

$$L(\text{sim}_k, \text{ for } a_i \& v_j \text{ of sim}_k, \text{ for } i=1 \ldots n, j=1 \ldots m, k=1 \ldots r) = \Sigma_i G_i(a_i) + \Sigma_j P_j(v_j) \quad \text{Eq. 4}$$

$$L(\text{sim}_k, \text{ for } a_i \& v_j \text{ of sim}_k, \text{ for } i=1 \ldots n, j=1 \ldots m, k=1 \ldots r) = \Pi_i G_i(a_i) + \Pi_j P_j(v_j) \quad \text{Eq. 5}$$

$$L(\text{sim}_k, \text{ for } a_i \& v_j \text{ of sim}_k, \text{ for } i=1 \ldots n, j=1 \ldots m, k=1 \ldots r) = \Pi_i G_i(a_i) + \Sigma_j P_j(v_j) \quad \text{Eq. 6}$$

$$L(\text{sim}_k, \text{ for } a_i \& v_j \text{ of sim}_k, \text{ for } i=1 \ldots n, j=1 \ldots m, k=1 \ldots r) = \Sigma_i G_i(a_i) + \Pi_j P_j(v_j) \quad \text{Eq. 7}$$

$$L(\text{sim}_k, \text{ for } a_i \& v_j \text{ of sim}_k, \text{ for } i=1 \ldots n, j=1 \ldots m, k=1 \ldots r) = \Sigma_i G_i(a_i) \times \Sigma_j P_j(v_j) \quad \text{Eq. 8}$$

$$L(\text{sim}_k, \text{ for } a_i \& v_j \text{ of sim}_k, \text{ for } i=1 \ldots n, j=1 \ldots m, k=1 \ldots r) = \Sigma_i G_i(a_i) \times \Pi_j P_j(v_j) \quad \text{Eq. 9}$$

$$L(\text{sim}_k, \text{ for } a_i \& v_i \text{ of sim}_k, \text{ for } i=1 \ldots n, j=1 \ldots m, k=1 \ldots r) = \Pi_i G_i(a_i) \times \Sigma_j P_j(v_j) \quad \text{Eq. 10}$$

Optionally, each of the terms of each of the combination of probabilities may be weighted with a user defined weight value such that the user may increase or decrease the emphasis for each particular probability term. For instance, for validation data, if a user feels that an interval thickness measurement is more important than a porosity measurement, the interval thickness may be assigned a weight of 1.5 by the user while the porosity may only be assigned a weight of 1.0. Likewise, for example, for forward model input parameters, if a user feels that sea level is a little more important than uplift/subsidence rate, the sea level may be assign a weight of 1.1 to the sea level and only a weight of 1.0 to the uplift/subsidence rate. See Eqs. 11 & 12 below showing an example of three term weighted validation data value probabilities for the product and summation, respectively, of validation data probabilities, where $vw_{1-3}$ represent the user defined validation data weight values. Likewise, See Eqs. 13 & 14 below showing an example of three term weighted forward model input parameter probabilities for the product and summation, respectively, of forward model input parameter probabilities, where $pw_{1-3}$ represent the user defined forward model input parameter weight values.

$$\Pi_j vw_j P_j(v_j)(\text{for } j=1 \ldots 3) = vw_1 P_1(v_1) \times vw_2 P_2(v_2) \times vw_3 P_3(v_3) \quad \text{Eq. 11}$$

$$\Sigma_j vw_j P_j(v_j)(\text{for } j=1 \ldots m) = vw_1 P_1(v_1) + vw_2 P_2(v_2) + vw_3 P_3(v_3) \quad \text{Eq. 12}$$

$$\Pi_i pw_i G_i(a_i)(\text{for } i=1 \ldots 3) = pw_1 G_1(a_1) \times pw_2 G_2(a_2) \times pw_3 G_3(a_3) \quad \text{Eq. 13}$$

$$\Sigma_i pw_i G_i(a_i)(\text{for } i=1 \ldots 3) = pw_1 G_1(a_1) + pw_2 G_2(a_2) + pw_3 G_3(a_3) \quad \text{Eq. 14}$$

At process 126, an embodiment selects at least one stratigraphic simulation model result and the associated forward model input parameter set as most likely as a function of a higher simulation model result likelihood as calculated, for example, according to Eqs. 3-10 above. An embodiment may select the stratigraphic simulation model result and associated forward model input parameter set with the highest simulation model result likelihood as the single most likely stratigraphic simulation model result and associated forward model input parameter set. Another embodiment may instead select a suite of multiple stratigraphic simulation model results and associated forward model input parameter sets as a group of the most likely stratigraphic simulation model results and associated forward model input parameter sets where a user may desire to see a range of most likely stratigraphic simulation model result basins for investigation.

At process 128, the user utilizes the at least one stratigraphic simulation model result basin to make decisions regarding the actual basin, such as, but not limited to: exploration, production, and/or additional testing, of the actual basin. As with the above described user selections/identifications of processes 102-108, while it may also be possible to automate the decision making process with regard to the at least one simulation model result basin and the associated forward model input parameter set using a variety of techniques such as searching the most likely stratigraphic simulation model results for predefined geologic features that indicate recoverable material, such automation is not necessary for an embodiment. Thus, the embodiment may provide a selection of one or more most likely simulation model result of an actual basin that permits a user to effectively analyze of the basin for exploration and/or production decisions without the need to perform additional, expensive testing procedures on the actual basin.

FIG. 1B is a flow chart detail 130 for an embodiment that creates a forward model input parameter set for substantially all permutations of forward model input parameter value within the limits/ranges of the forward model input parameters. At process 132, when creating the plurality of forward model input parameter sets in process 114, an embodiment creates a forward model input parameter set for substantially all input parameter combinations within the limits/ranges of the input parameters. Various embodiments may use Monte Carlo simulation, frequency distribution plots, and/or other appropriate techniques to create substantially all of the permutations of forward model input parameter sets. As many, if not all, of the forward model input parameters may be analog values, it may be possible that to attempt to create all potential forward model input parameter sets would result in an infinite number of input parameter sets. Accordingly, an embodiment may choose to increment samples through the range of geologically reasonable values for each forward model input parameter at a predefined sampling step size so as to create a finite number of input parameter sets that is substantially representative of all permutations of the forward model input parameters within the defined limits/ranges of the forward model input parameters.

FIG. 1C is a flow chart detail 140 for an embodiment that creates a forward model parameter set based on a standard optimization method. At process 142, when creating the plurality of forward model input parameter sets in process 114, an embodiment creates a forward model input parameter set only for combinations of forward model input parameters that satisfy a standard optimization method. By reducing the number of forward model input parameter sets to some subset of substantially all forward model input parameter sets, the computation time to create stratigraphic simulation model result basins at process 116 by executing the selected stratigraphic forward model simulation program is reduced. Even with the reduced number of forward model input parameter sets, the optimum forward model input parameter sets are processed while only outlier forward input model parameter sets are eliminated from processing. One potential optimization method, using a portion of the simulation result likelihood calculation of Eq. 3, would be to calculate the product of the probabilities for each forward model input parameter set (see, for example, Eq. 15 below). Another potential optimization method, using a portion of the simulation result likelihood calculation of Eq. 4, would be to calculate the sum of the probabilities for each forward model input parameter set (see, for example, Eq. 16 below). The forward model input parameter values in each forward model input parameter set are not dependent on the stratigraphic model simulation program results, so the product of the probabilities for each potential forward model input parameter set may be calculated by an embodiment and all potential forward model input parameter sets with a forward model input parameter set likelihood below a predefined threshold may be eliminated from further processing. Accordingly, Eqs. 15 or 16 may represent the plurality of forward model input parameter set likelihood calculations for the plurality of potential forward model input parameter sets, where G represents the probability distribution of each forward model input parameter in a potential forward model input parameter set, a represents the forward model input parameter, i represents the index number of forward model input parameters, n represents the total number of forward model input parameters, k represents the index number of potential forward model input parameter sets, and r represents the total number of potential forward model input parameter sets.

$$L(set_k, \text{ for } a_i \& v_j \text{ of } set_k, \text{ for } i=1 \ldots n, k=1 \ldots r) = \Pi_i G_i(a_i) \quad \text{Eq. 15}$$

$$L(set_k, \text{ for } a_i \& v_j \text{ of } set_k, \text{ for } i=1 \ldots n, k=1 \ldots r) = \Sigma_i G_i(a_i) \quad \text{Eq. 16}$$

FIG. 1D is a flow chart detail 150 for an embodiment that automatically sets forward model input parameter ranges and sampling step sizes. At process 152, an embodiment may automatically set the limits/range of each forward model input parameter as a function of the associated probability distribution of each forward model input parameter. For example, an embodiment may set the geologically reasonable limits/range of a forward model input parameter as a function of the standard deviation (i.e., σ) of the probability distribution of the forward model input parameter. An embodiment may choose plus or minus a multiple of the standard deviation (i.e., σ) of the probability distribution, such as two times the standard deviation (i.e., +/−2σ), as the limits/range for a forward model input parameter. At process 154, an embodiment may further automatically set a sampling step size for incrementing values of each for model input parameter during creation of the plurality of forward model input parameters in process 114 for each forward model input parameter as a fraction of the range of each forward model input parameter. For instance, if the step size were one tenth of the range of a parameter, there would be a fixed number of 11 different values of the forward model input parameter over the range of possible values when including both the minimum and maximum extents of the defined range of the forward model input parameter. The fractional value may be chosen so as to have a statistically sufficient sampling of the range of values over the range for each forward model input parameter while at the same time limiting the number of potential permutations of the overall forward model input parameter sets to a value that may permit performing a simulation run of the stratigraphic forward model simulation program for each potential forward model input parameter set (i.e., each permutation of forward model input parameter values) by the computer system performing the processing for an embodiment in a time that is acceptable to the user.

FIG. 1E is a flow chart detail 160 for an embodiment that sets forward model input parameter ranges and sampling step sizes by user data entry. At process 162, an embodiment may set the limits/range of each forward model input parameter in accord with a user data entry. At process 164, an embodiment may, likewise, set a sampling step size for incrementing values of each for model input parameter during creation of the plurality of forward model input parameters in process 114 for each forward model input parameter in accord with a user data entry.

FIG. 1F is a flow chart detail 170 for an embodiment that selects as most likely the simulation model result with a highest calculated simulation model result likelihood. At process 172, selects the single stratigraphic simulation model result and associated forward model input parameter set with the highest simulation model result likelihood as the single most likely stratigraphic simulation model result and associated forward model input parameter set.

FIG. 1G is a flow chart detail 180 for an embodiment that selects as most likely a suite of simulation model results that have a calculated simulation model result likelihood that exceeds a predefined threshold. At process 182, selects a suite of multiple most likely stratigraphic simulation model results and associated forward model input parameter sets as a group of the most likely stratigraphic simulation model results and associated forward model input parameter sets where each associated calculated simulation model result likelihood from process 124 meets or exceeds a predefined likelihood threshold. At process 184, an embodiment may calculate a probability distribution for the suite of stratigraphic simulation model results and associated forward model input parameter sets from process 182 as a function of the calculated simulation model result likelihoods of the stratigraphic simulation model results included in the suite of most likely simulation model results and associated forward model input parameter sets. For example, a probability distribution may calculate the probability of each stratigraphic simulation model result as the likelihood of each stratigraphic simulation model result divided by the sum of all simulation model result likelihoods for all stratigraphic simulation model results in the suite of stratigraphic simulation model results (see, for example, Eq. 17 below). Accordingly, Eq. 17 may represent the probability calculation for each stratigraphic simulation model result in the suite of stratigraphic simulation model results, where $P_s$ represents the probability of a stratigraphic simulation model result within the suite of stratigraphic simulation model results, $sim_k$ represents the identification of which stratigraphic simulation model result of all stratigraphic simulation model results in the suite of stratigraphic simulation model results is being evaluated, and k represents the index number of stratigraphic simulation model results within the suite of stratigraphic simulation model results.

$$P_s(sim_k) = L(sim_k)/\Sigma_k L(sim_k) \quad \text{Eq. 17}$$

Additionally, while the flow charts and flow chart details described above with respect to FIGS. 1A-G describe a methodology that may be embodied as a method or process, another embodiment may be recognized as a computer system that automatically selects most likely simulated basin results by implementing the processes described above with respect to the flow charts and flow chart details of FIGS. 1A-G. Further, in describing the computer system that automatically selects most likely simulated basin results one, or more, individual processes described above for the methodology may be broken down and represented as a subsystem of the overall computer system that automatically selects most likely simulated basin results. A subsystem of the computer system that automatically selects most likely simulated basin results may be assigned, in whole or in part, to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

The disclosure with respect to FIGS. 2-13 below provides a simplified example of the operations and data relationships during the performance of an embodiment. The amount of data, the type of data, and the particular data values shown and described in the example are not meant to represent any particular real system or real geologic basin, but are provided only for the purpose of showing the operations and data relationships of an embodiment.

Figure 2:
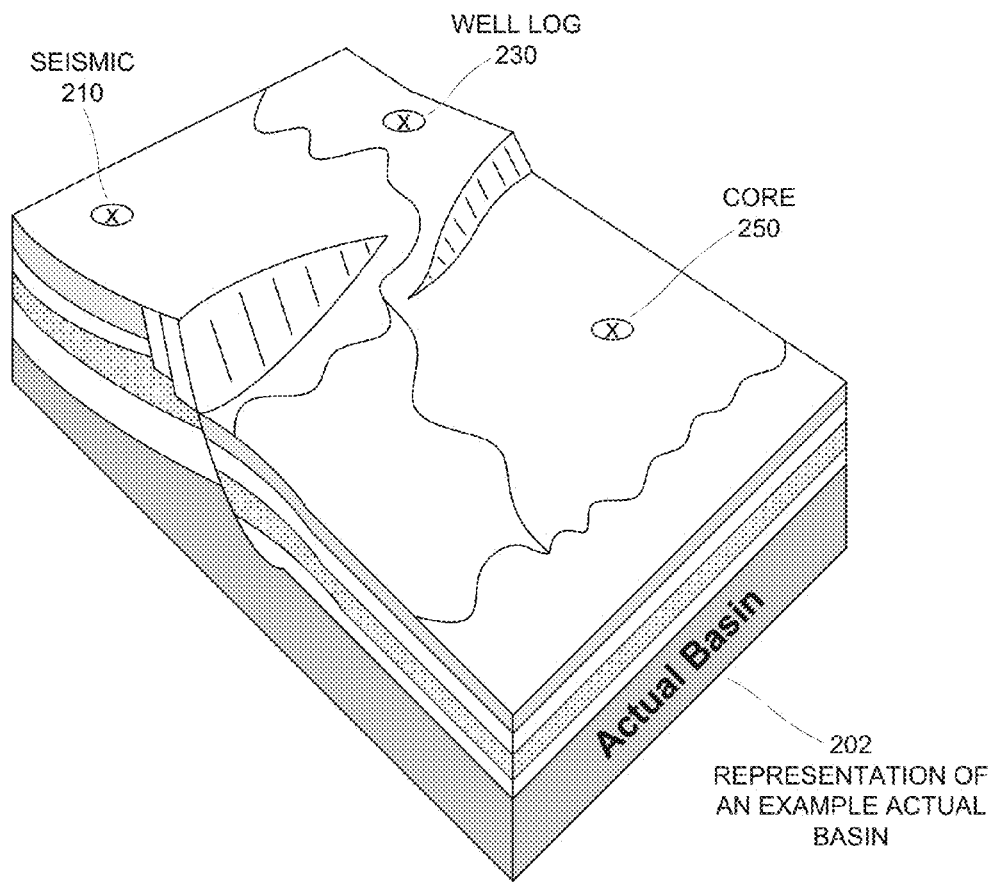
FIG. 2 is a schematic illustration of an example actual basin showing validation gathering locations.

FIG. 2 is a schematic illustration 200 of an example actual basin 202 showing validation gathering locations 210, 230, 250. On the representation of the actual basin 202, a seismic measurement 210 is performed in the back, left hand corner of the basin 202. A well log 230 is performed in the back, right hand corner of the basin 202. And, a core 250 is performed in the front, right hand corner of the basin 202. The seismic 210, well log 230, and well log 250 represent the test measurements used to observer or derive the validation data values for the actual basin 202.

Figure 3A:
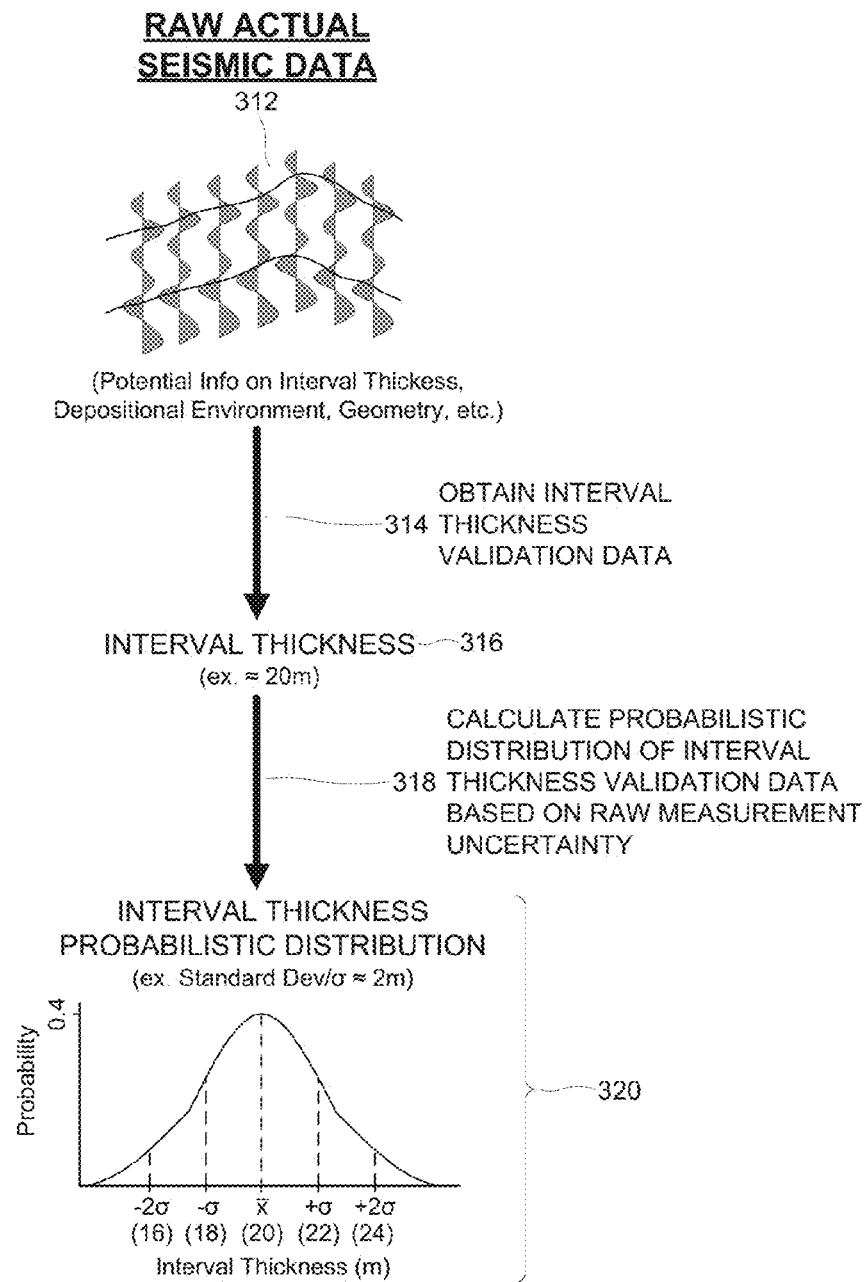
FIG. 3A is an illustration of the progression in the creation of a probabilistic distribution for an example seismically derived interval thickness validation data value.

FIG. 3A is an illustration 310 of the progression in the creation of a probabilistic distribution 320 for an example seismically 312 derived interval thickness validation data value 316. The raw actual seismic data 312 may contain information to derive interval thickness, depositional environment, geometry, etc. for the actual basin 202. For the example, the raw actual seismic data 312 is evaluated to obtain 314 the interval thickness 316. For the example shown, the interval thickness 316 is assigned a value of approximately 20 meters. Given the interval thickness 316 and the uncertainty of the raw actual seismic data 312 (given as representative of a standard deviation, or σ, of 2 meters), an embodiment may calculate 318 the probabilistic distribution 320 of the interval thickness validation data value 316.

Figure 3B:
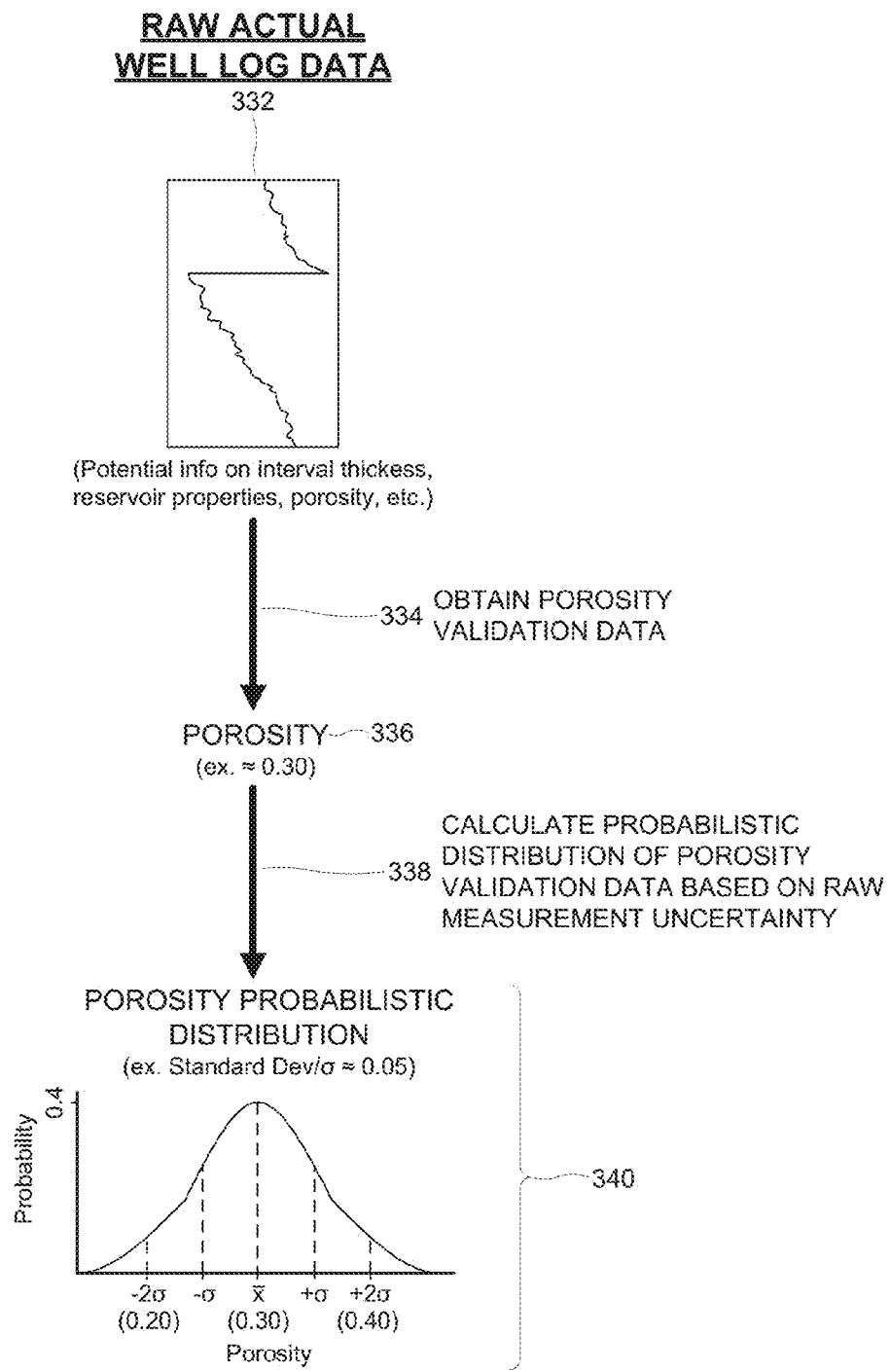
FIG. 3B is an illustration of the progression in the creation of a probabilistic distribution for an example well log derived porosity validation data value.

FIG. 3B is an illustration 330 of the progression in the creation of a probabilistic distribution 340 for an example well log 332 derived porosity validation data value 336. The raw actual well log data 332 may contain information to derive interval thickness, reservoir properties, porosity, etc. for the actual basin 202. For the example, the raw actual well log data 332 is evaluated to obtain 334 the porosity 336. For the example shown, the porosity 336 is assigned a value of approximately 0.30 (there are no units as porosity is a ratio).

Given the porosity 336 and the uncertainty of the raw well log data 332 (given as representative of a standard deviation, or σ, of 0.05), an embodiment may calculate 338 the probabilistic distribution 340 of the porosity validation data value 336.

Figure 3C:
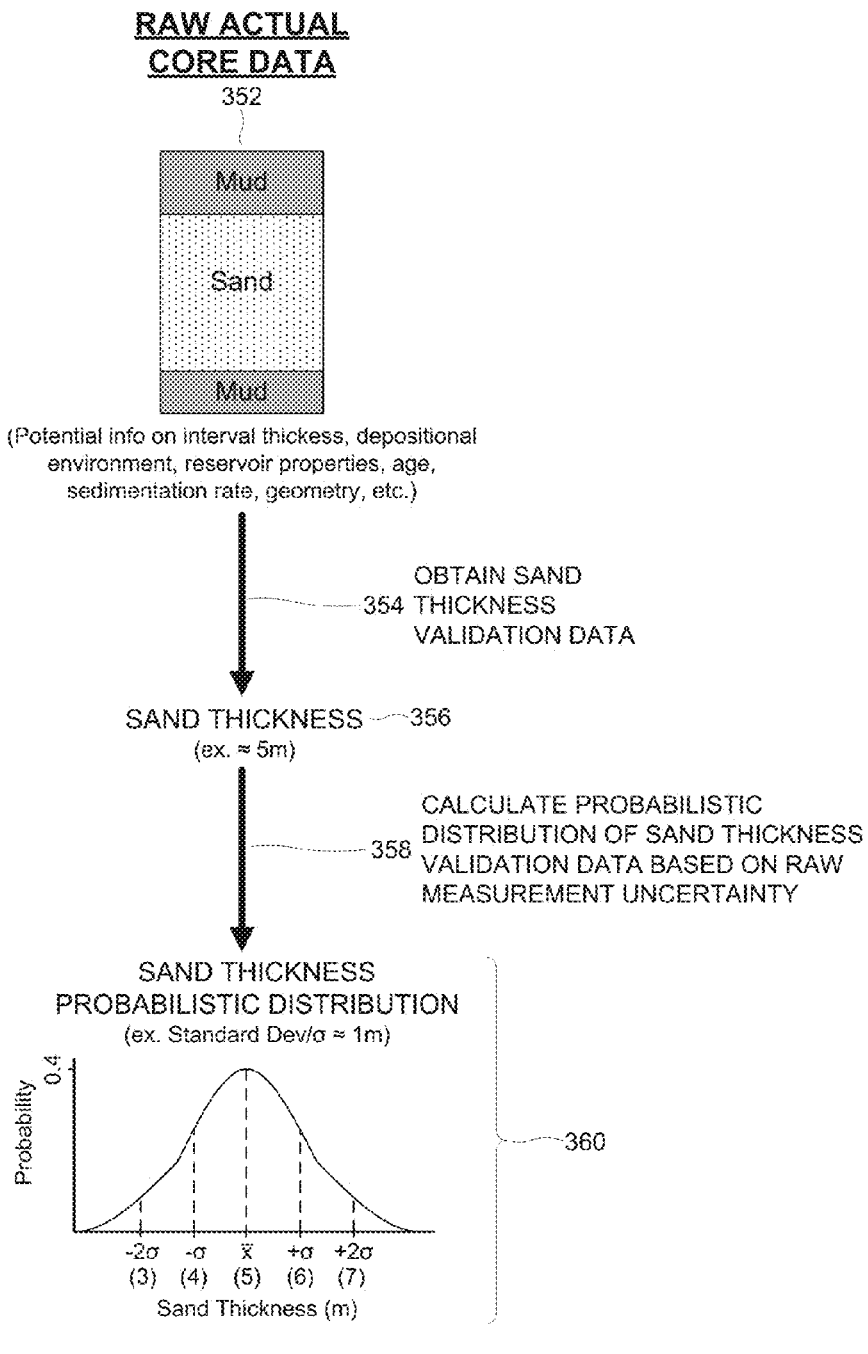
FIG. 3C is an illustration of the progression in the creation of a probabilistic distribution for an example core derived sand thickness validation data value.

FIG. 3C is an illustration 350 of the progression in the creation of a probabilistic distribution 360 for an example core 352 derived sand thickness validation data value 356. The raw actual core data 352 may contain information to derive interval thickness, depositional environment, reservoir properties, age, sedimentation rate, geometry, etc. for the actual basin 202. For the example, the raw actual seismic data 312 is evaluated to obtain 314 the interval thickness 316. For the example shown, the sand thickness 356 is assigned a value of approximately 5 meters. Given the sand thickness 356 and the uncertainty of the raw actual core data 352 (given as representative of a standard deviation, or σ, of 1 meter), an embodiment may calculate 358 the probabilistic distribution 360 of the sand thickness validation data value 356.

Figure 4:
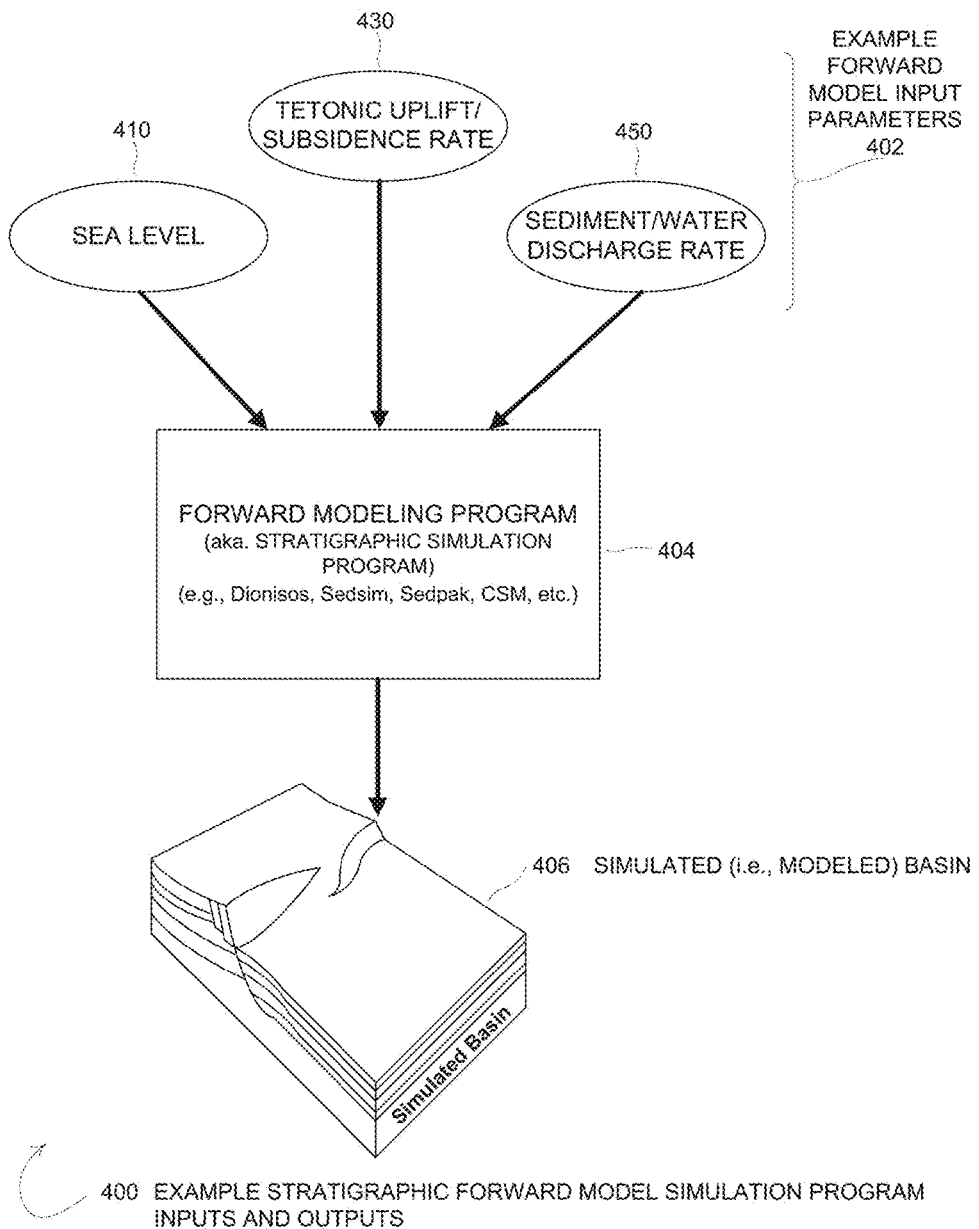
FIG. 4 is a block diagram of the inputs and outputs for an example stratigraphic forward model simulation program.

FIG. 4 is a block diagram 400 of the inputs 402 and outputs 406 for an example stratigraphic forward model simulation program 404. Some potential forward model simulation programs 404, include, but are not limited to: DIONISOS, SEDSIM, SEDPAK, and CSDMS (Community Surface Dynamics Modeling System). For the example shown in FIG. 4, the forward model input parameters 402 for the selected stratigraphic forward model simulation program 404, includes sea level 410, tectonic uplift/subsidence rate 430, and sediment/water discharge rat 450. Based on the forward model input parameter 402 values, the stratigraphic forward model simulation program 404, when executed, outputs a simulated (i.e., modeled) basin 406. If the values of the forward model input parameters 402 change, the stratigraphic forward model simulation program 404 would create a different (even if only slight different) stratigraphic forward model simulation basin result 406.

Figure 5A:
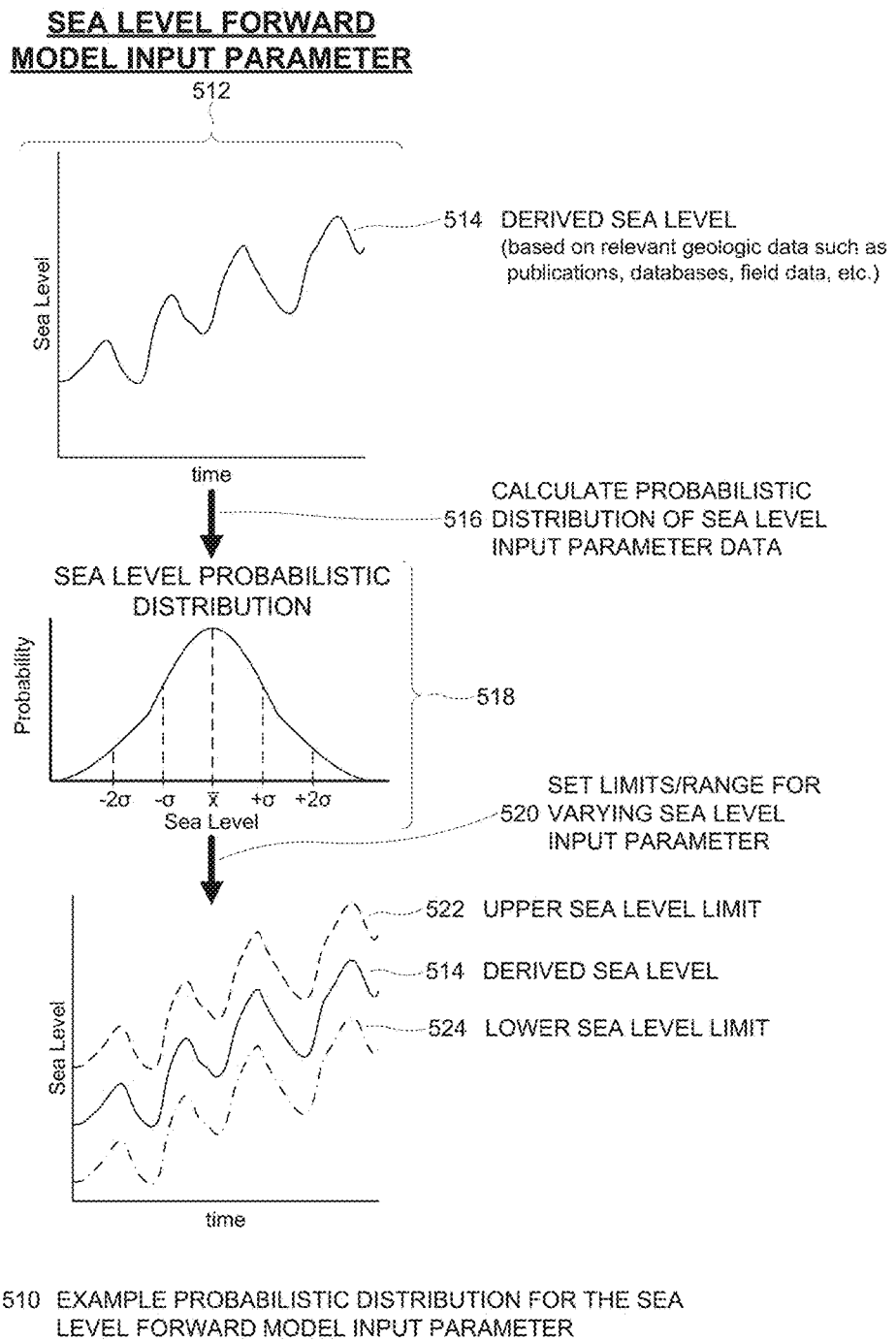
FIG. 5A is an illustration of the progression in the creation of a probabilistic distribution for an example sea level forward model input parameter.

FIG. 5A is an illustration 510 of the progression in the creation of a probabilistic distribution 518 for an example sea level forward model input parameter 512. The sea level forward model input parameter 512 has a derived value 514 derived from relevant geologic data such as publications, databases, field data, etc. Given the derived sea level 514 and the uncertainty of the theoretical and/or empirical relationships relevant to the geologic data used to derive/obtain the sea level value 514, an embodiment may calculate 516 the probabilistic distribution 518 of the sea level forward model input parameter 512. Given the probabilistic distribution 518 of the sea level forward model input parameter 512, an embodiment (or a user) may set the upper 522 and lower 524 limits of the range for the sea level forward model input parameter 512 to geologically reasonable limits.

Figure 5B:
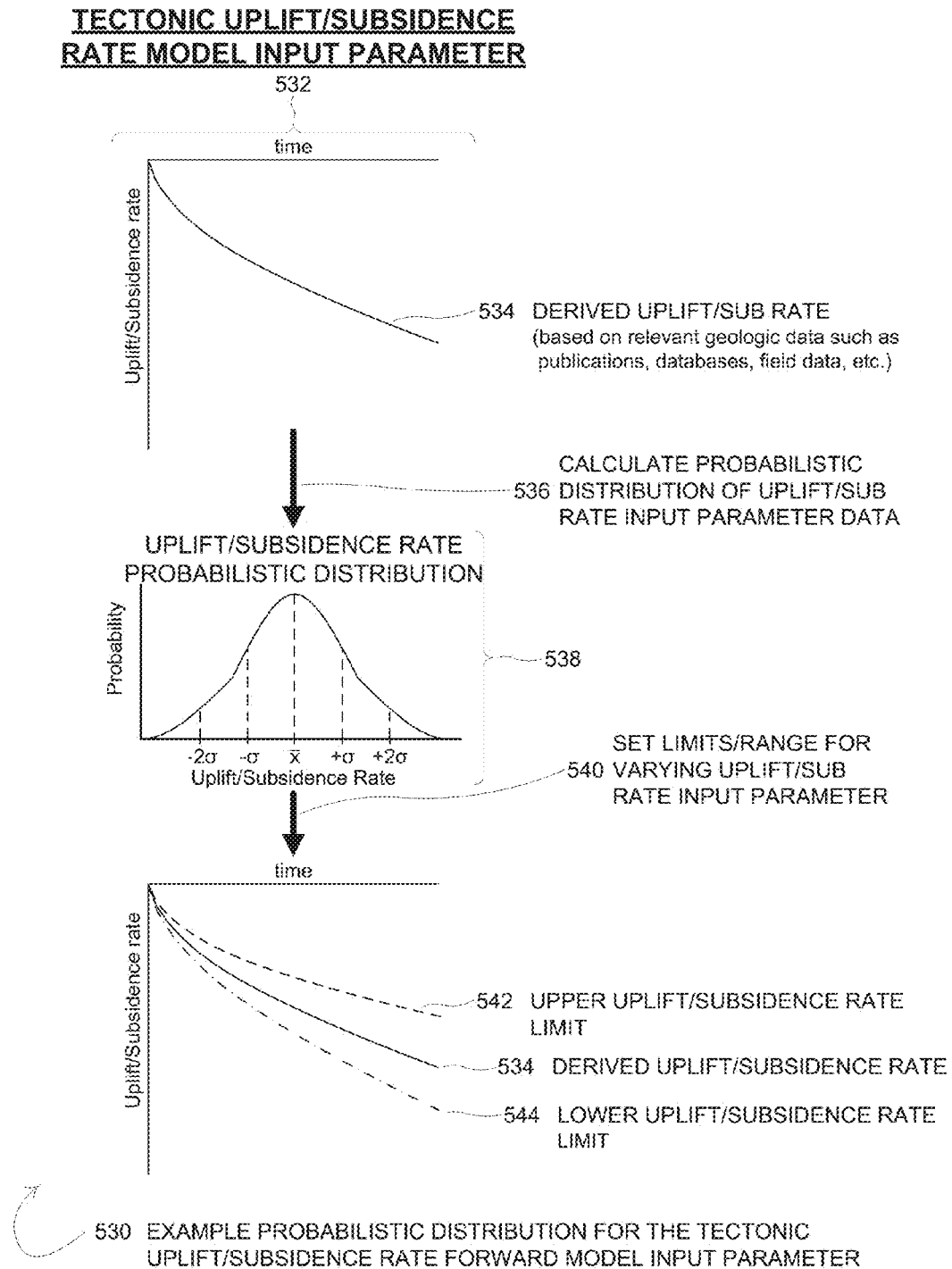
FIG. 5B is an illustration of the progression in the creation of a probabilistic distribution for an example tectonic uplift/subsidence rate forward model input parameter.

FIG. 5B is an illustration 530 of the progression in the creation of a probabilistic distribution 538 for an example tectonic uplift/subsidence rate forward model input parameter 532. The tectonic uplift/subsidence rate forward model input parameter 532 has a derived value 534 derived from relevant geologic data such as publications, databases, field data, etc. Given the derived tectonic uplift/subsidence rate 514 and the uncertainty of the theoretical and/or empirical relationships relevant to the geologic data used to derive/obtain the tectonic uplift/subsidence rate value 534, an embodiment may calculate 536 the probabilistic distribution 538 of the tectonic uplift/subsidence rate forward model input parameter 532. Given the probabilistic distribution 538 of the tectonic uplift/subsidence rate forward model input parameter 532, an embodiment (or a user) may set the upper 542 and lower 544 limits of the range for the tectonic uplift/subsidence rate forward model input parameter 532 to geologically reasonable limits.

FIG. 5C is an illustration 550 of the progression in the creation of a probabilistic distribution 558 for an example sediment/water discharge rate forward model input parameter 552. The sediment/water discharge rate forward model input parameter 552 has a derived value 554 derived from relevant geologic data such as publications, databases, field data, etc. Given the derived sediment/water discharge rate 554 and the uncertainty of the theoretical and/or empirical relationships relevant to the geologic data used to derive/obtain the sediment/water discharge rate value 554, an embodiment may calculate 556 the probabilistic distribution 558 of the sediment/water discharge rate forward model input parameter 552. Given the probabilistic distribution 558 of the sea level forward model input parameter 552, an embodiment (or a user) may set the upper 552 and lower 554 limits of the range for the sediment/water discharge rate forward model input parameter 552 to geologically reasonable limits.

Figure 6:
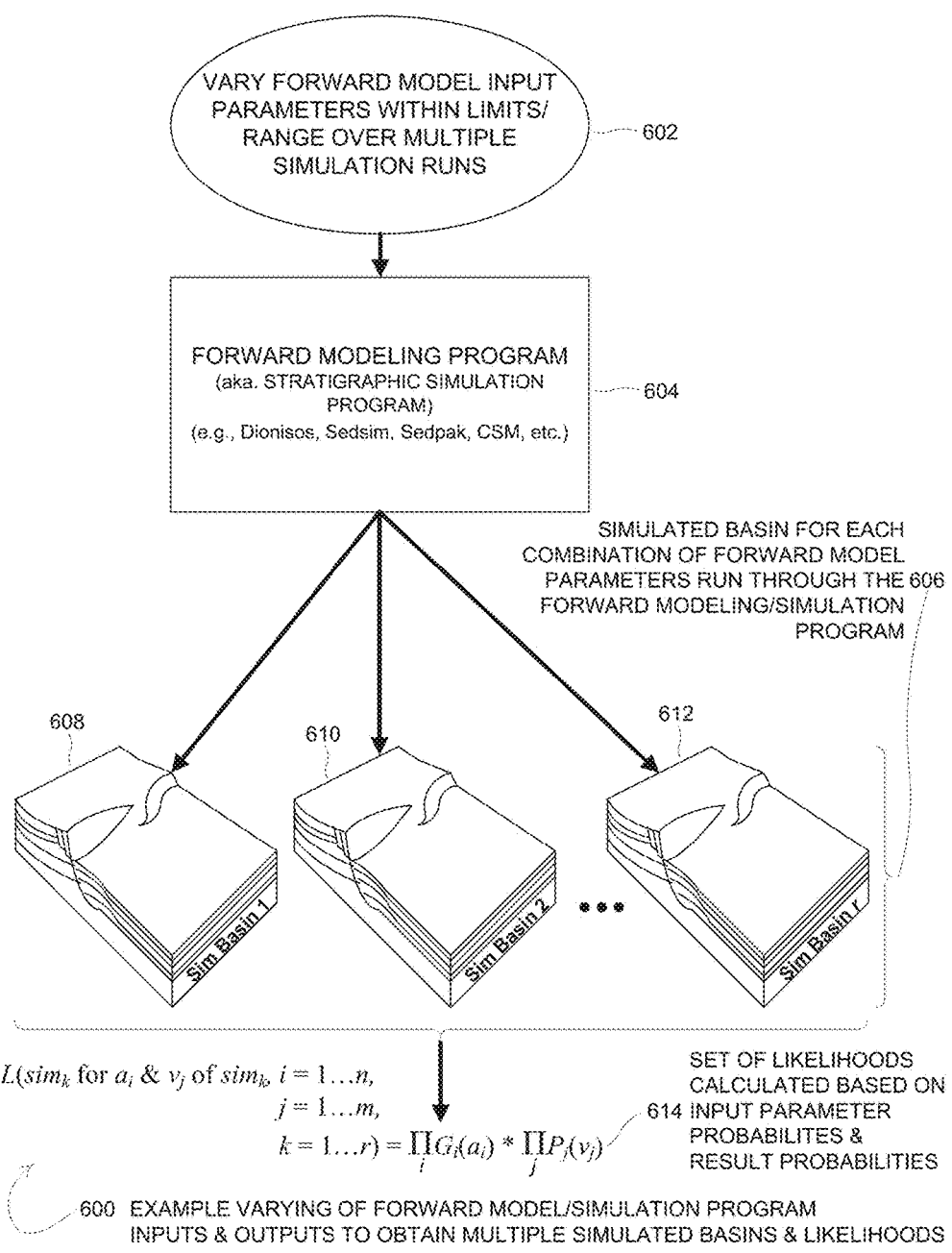
FIG. 6 is a block diagram of the varying of the forward model input parameters and the associated plurality of output simulation model results outputs for an example stratigraphic forward model simulation program.

FIG. 6 is a block diagram 600 of the varying of the forward model input parameters 602 and the associated plurality of output simulation model results 606 outputs for an example stratigraphic forward model simulation program 604. As shown in FIG. 6, the forward model input parameters are varied 602 within the limits/range of each forward model input parameter over multiple runs of the stratigraphic forward model simulation program 604 to create a plurality of simulated basins 606 for each combination (i.e., each forward model input parameter set) of forward model input parameters run through the stratigraphic forward model simulation program 604. As shown in FIG. 6, the stratigraphic forward model simulation program 604 produces stratigraphic simulation model result basins number 1 (608), number 2 (610), through to r (612), where r represents a total number of unique executions of the stratigraphic forward model simulation program 604. For the particular embodiment(s) described with respect to FIGS. 6-13, the product of the products combination from Eq. 3 above is used to calculation the simulation model result likelihood. Accordingly, using Eq. 3 above, the set of likelihoods for each stratigraphic simulation model result basin 606 may be calculated 614 based on input parameter probabilities (see, for example, the disclosure with respect to FIGS. 7A-D and 10A-D) and result validation data value probabilities (see, for example, the disclosure with respect to FIGS. 8A-E and 11A-E).

FIG. 7A is an illustration 710 of determining the probability 712 for a particular first example sea level forward model input parameter. Given the calculated sea level probabilistic distribution 518, the value of the sea level input parameter for the first example forward model input parameter set may be used to locate on the sea level probabilistic distribution curve 518 the probability 712 of the example first sea level forward model input parameter for a first run of the stratigraphic forward model simulation program. In the example, the probability 712 is shown to have an approximate value of 0.29.

FIG. 7B is an illustration 730 of determining the probability 732 for a particular first example tectonic uplift/subsidence rate forward model input parameter. Given the calculated tectonic uplift/subsidence rate probabilistic distribution 538, the value of the tectonic uplift/subsidence rate input parameter for the first example forward model input parameter set may be used to locate on the tectonic uplift/subsidence rate probabilistic distribution curve 538 the probability 732 of the example first tectonic uplift/subsidence rate forward model input parameter for a first run of the stratigraphic forward model simulation program. In the example, the probability 732 is shown to have an approximate value of 0.37.

FIG. 7C is an illustration 750 of determining the probability 752 for a particular first example sediment/water discharge rate forward model input parameter. Given the calculated sediment/water discharge rate probabilistic distribution 558, the value of the sediment/water discharge rate input parameter for the first example forward model input parameter set may be used to locate on the sediment/water discharge rate probabilistic distribution curve 558 the probability 752 of the example first sea level forward model input parameter for a first run of the stratigraphic forward model simulation program. In the example, the probability 752 is shown to have an approximate value of 0.15.

FIG. 7D is an illustration 770 of the progression in the calculation 772 of a product of probabilities 774 for a first example forward model input parameter set. In looking at the likelihood equation (i.e., Eq. 3 disclosed above), it can be seen that the general product of the probabilities 774 for a forward model input parameter set is a subset of the overall Eq. 3 (see, for example, Eq. 18 below). Accordingly, Eq. 18 may represent the product of probabilities for a forward model input parameter set where G represents the probability distribution of each forward model input parameter in a forward model input parameter set associated with each stratigraphic simulation model result, a represents the forward model input parameter, i represents the index number of forward model input parameters, and n represents the total number of forward model input parameters.

$$\Pi_i G_i(a_i) \text{ for } i=1\ldots n \qquad \text{Eq. 18}$$

Plugging in the probabilities for the example first simulation run of 0.29 for the example first simulation run sea level probability 712, of 0.37 for the example first simulation run tectonic uplift/subsidence rate probability 732, and of 0.15 for the example first simulation run sediment/water discharge rate probability 752, the product of the probabilities 776 for the example first simulation run from Eq. 18 (774) would be 0.016095.

Figure 8A:
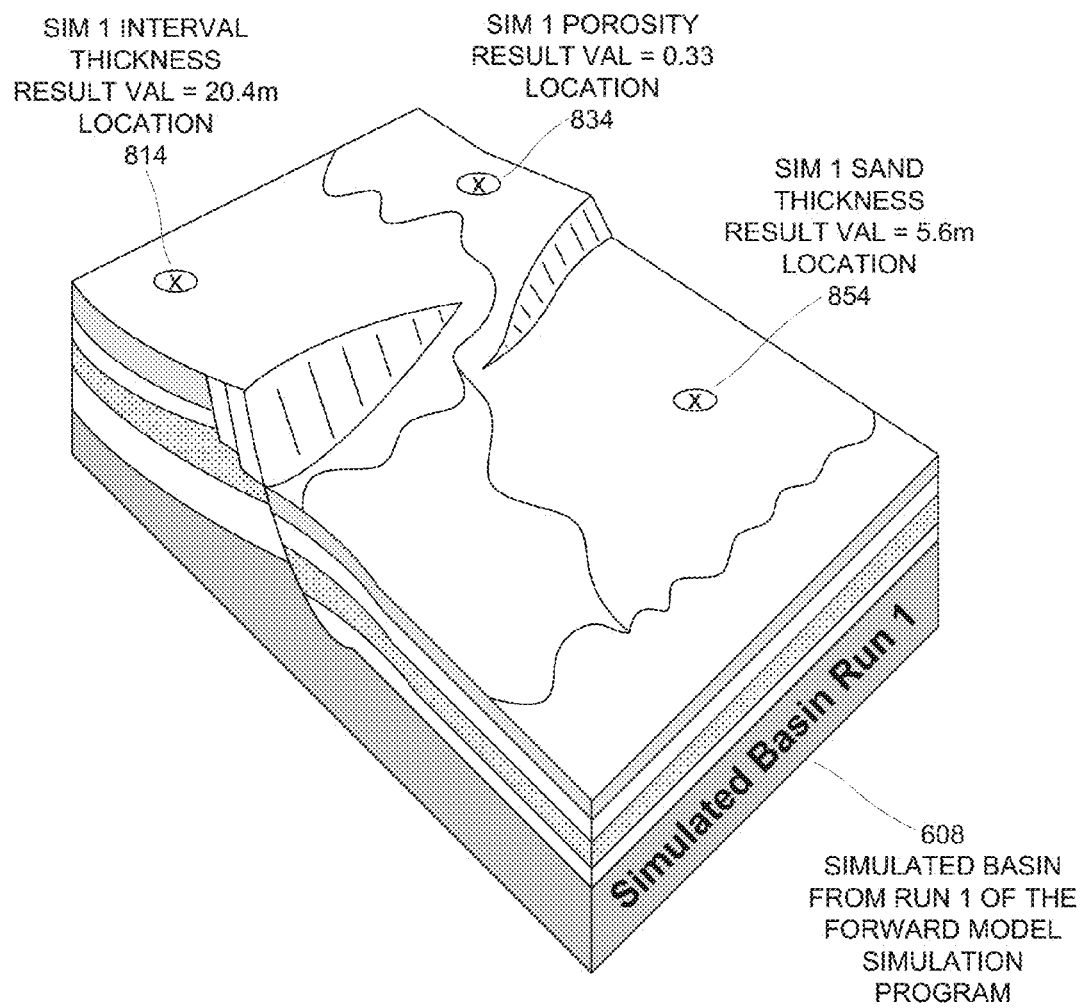
FIG. 8A is a schematic illustration of an example simulated model result basin for a first run using a first set of forward model input parameter values of a stratigraphic forward model simulation program showing validation data locations.

FIG. 8A is a schematic illustration 800 of an example simulated model result basin 608 for a first run using a first set of forward model input parameter values of a stratigraphic forward model simulation program showing validation data locations 814, 834, 854. On the representation of the first simulated result basin 608, the first simulation interval thickness simulation validation value 814 (given as 20.4 meters) is shown as determined within the first simulated model basin 608 at approximately a comparable location to the seismic measurement 210 of FIG. 2 used to derive the comparable interval thickness validation data value 316 of the of the actual basin 202. The first simulation porosity simulation validation value 834 (given as 0.33) is shown as determined within the first simulated model basin 608 at approximately a comparable location to the well log measurement 230 of FIG. 2 used to derive the comparable porosity validation data value 336 of the of the actual basin 202. The first simulation sand thickness simulation validation value 854 (given as 5.6 meters) is shown as determined within the first simulated model basin 608 at approximately a comparable location to the core measurement 250 of FIG. 2 used to derive the comparable sand thickness validation data value 356 of the of the actual basin 202. Thus, the simulation validation values 814, 834, 854 are evaluated at comparable locations on the first simulated basin model result 608 as the associated validation data values 316, 336, 356 were located on the actual basin 202 such that the simulation validation values 814, 834, 854 may use the probability curves 320, 330, 350 calculated for the validation data values 316, 336, 356 of the actual basin 202.

FIG. 8B is an illustration 810 of determining the probability 812 for a particular first example interval thickness simulation validation data value 814 of approximately 20.4 meters. Given the calculated interval thickness validation data probabilistic distribution 320, the value (e.g., 20.4 meters) of the example interval thickness simulation validation data value 814 found on the first stratigraphic forward model simulation result basin 608 may be used to locate on the interval thickness validation data probabilistic distribution curve 320 the probability 812 of the example interval thickness validation data value 814 for a first run of the stratigraphic forward model simulation program. In the example, the probability 812 is shown to have an approximate value of 0.39.

FIG. 8C is an illustration 830 of determining the probability for a particular first example porosity simulation validation data value 834 of approximately 0.33. Given the calculated porosity validation data probabilistic distribution 340, the value (e.g., 0.33) of the example porosity simulation validation data value 834 found on the first stratigraphic forward model simulation result basin 608 may be used to locate on the porosity validation data probabilistic distribution curve 320 the probability 832 of the example porosity validation data value 834 for a first run of the stratigraphic forward model simulation program. In the example, the probability 832 is shown to have an approximate value of 0.33.

FIG. 8D is an illustration 850 of determining the probability 852 for a particular first example sand thickness simulation validation data value 854 of approximately 5.6 meters. Given the calculated sand thickness validation data probabilistic distribution 350, the value (e.g., 5.6 meters) of the example sand thickness simulation validation data value 854 found on the first stratigraphic forward model simulation result basin 608 may be used to locate on the sand thickness validation data probabilistic distribution curve 360 the probability 852 of the example sand thickness validation data value 854 for a first run of the stratigraphic forward model simulation program. In the example, the probability 852 is shown to have an approximate value of 0.33.

FIG. 8E is an illustration 870 of the progression in the calculation 872 of a product of probabilities 874 for a first example plurality of simulation validation values 814, 834, 854. In looking at the likelihood equation (i.e., Eq. 3 disclosed above), it can be seen that the general product of the probabilities 874 for validation data values is a subset of the overall Eq. 3 (see, for example, Eq. 19 below). Accordingly, Eq. 19 may represent the product of probabilities for a plurality of simulation validation data values where P represents the probability distribution of each simulation validation data value of each simulation validation data value in a plurality of simulation validation values associated with each stratigraphic simulation model result, v represents the simulation validation data value, j represents the index number of simulation validation data values, and m represents the total number of simulation validation data values.

$$\Pi_j P_j(v_j) \text{ for } j=1 \ldots m \qquad \text{Eq. 19}$$

Plugging in the probabilities for the example first simulation run of 0.39 for the example first simulation interval thickness validation data value probability 812, of 0.33 for the example first simulation run porosity validation data value probability 832, and of 0.33 for the example first simulation run sand thickness validation data value probability 852, the product of the probabilities 876 for the example first simulation run from Eq. 19 (874) would be 0.0042471.

FIG. 9 is an illustration 900 of the progression in the calculation 902 of a likelihood 910 for a first example simulated model result basin 608. With the likelihood equation of Eq. 3 given above, the likelihood calculation may be reduced to the form of 974 for the likelihood calculation for the first example simulated model result basin 608. With the product of the probabilities 776 for the example first simulation run input parameter set and the product of the probabilities 876 for the example first simulation run plurality of simulation validation data values 814, 834, 854, value of the likelihood calculation for the example first simulation run would be given at 910 as a value of 0.000682571.

FIG. 10A is an illustration 1010 of determining the probability 1012 for a particular second example sea level forward model input parameter. Given the calculated sea level probabilistic distribution 518, the value of the sea level input parameter for the second example forward model input parameter set may be used to locate on the sea level probabilistic distribution curve 518 the probability 1012 of the example second sea level forward model input parameter for a second run of the stratigraphic forward model simulation program. In the example, the probability 1012 is shown to have an approximate value of 0.37.

FIG. 10B is an illustration 1030 of determining the probability 1032 for a particular second example tectonic uplift/subsidence rate forward model input parameter. Given the calculated tectonic uplift/subsidence rate probabilistic distribution 538, the value of the tectonic uplift/subsidence rate input parameter for the second example forward model input parameter set may be used to locate on the tectonic uplift/subsidence rate probabilistic distribution curve 538 the probability 1032 of the example second tectonic uplift/subsidence rate forward model input parameter for a second run of the stratigraphic forward model simulation program. In the example, the probability 1032 is shown to have an approximate value of 0.39.

FIG. 10C is an illustration 1050 of determining the probability 752 for a particular second example sediment/water discharge rate forward model input parameter. Given the calculated sediment/water discharge rate probabilistic distribution 558, the value of the sediment/water discharge rate input parameter for the second example forward model input parameter set may be used to locate on the sediment/water discharge rate probabilistic distribution curve 558 the probability 1052 of the example second sea level forward model input parameter for a second run of the stratigraphic forward model simulation program. In the example, the probability 1052 is shown to have an approximate value of 0.39.

FIG. 10D is an illustration 1070 of the progression in the calculation 1072 of a product of probabilities 774 for a second example forward model input parameter set. Again, in looking at the likelihood equation (i.e., Eq. 3 disclosed above), it can be seen that the general product of the probabilities 774 for a forward model input parameter set is a subset of the overall Eq. 3 (see, for example, Eq. 18 above). Plugging in the probabilities for the example second simulation run of 0.37 for the example second simulation run sea level probability 1012, of 0.39 for the example second simulation run tectonic uplift/subsidence rate probability 1032, and of 0.39 for the example second simulation run sediment/water discharge rate probability 1052, the product of the probabilities 1076 for the example second simulation run from Eq. 18 (774) would be 0.056277.

Figure 11A:
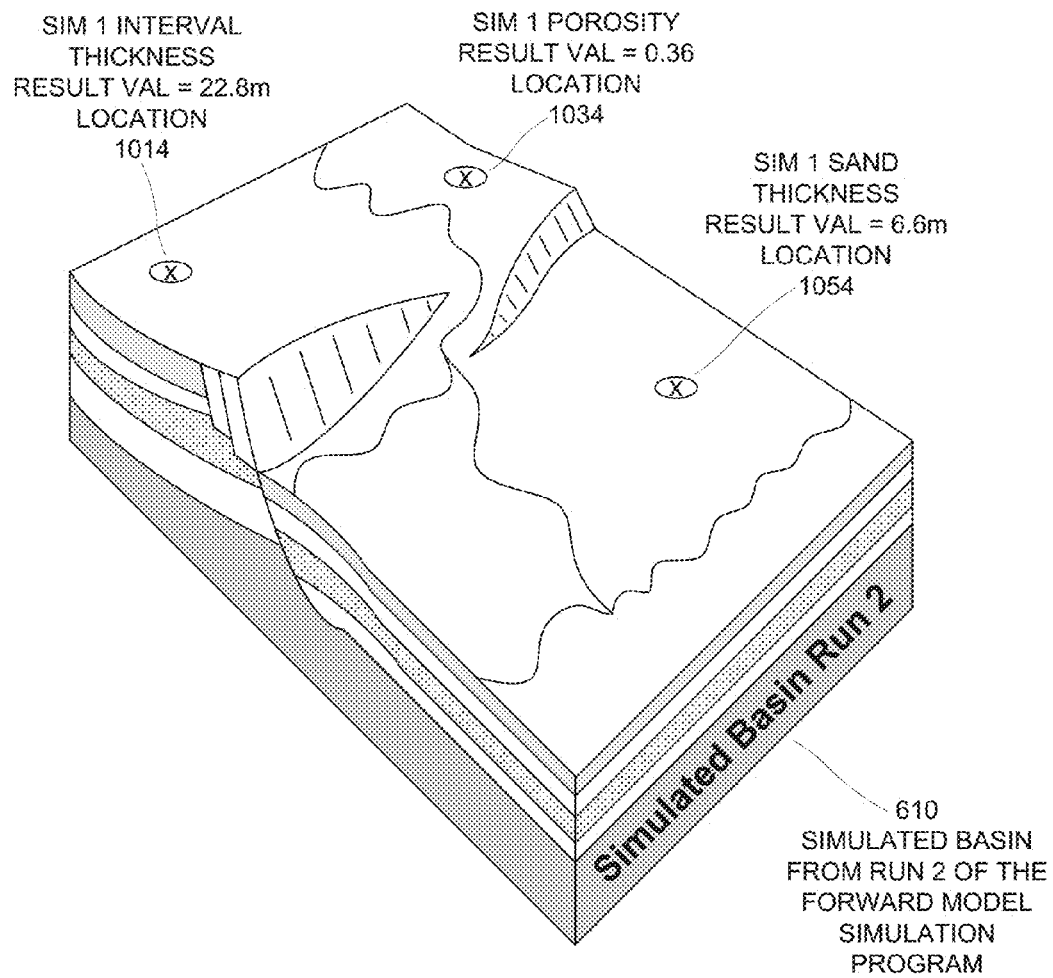
FIG. 11A is a schematic illustration of an example simulated model result basin for a second run using a second set of forward model input parameter values of a stratigraphic forward model simulation program showing validation data locations.

FIG. 11A is a schematic illustration 800 of an example simulated model result basin 610 for a second run using a second set of forward model input parameter values of a stratigraphic forward model simulation program showing validation data locations 1114, 1134, 1154. On the representation of the second simulated result basin 610, the second simulation interval thickness simulation validation value 1114 (given as 22.8 meters) is shown as determined within the second simulated model basin 610 at approximately a comparable location to the seismic measurement 210 of FIG. 2 used to derive the comparable interval thickness validation data value 316 of the of the actual basin 202. The second simulation porosity simulation validation value 1134 (given as 0.36) is shown as determined within the second simulated model basin 610 at approximately a comparable location to the well log measurement 230 of FIG. 2 used to derive the comparable porosity validation data value 336 of the of the actual basin 202. The second simulation sand thickness simulation validation value 1154 (given as 6.6 meters) is shown as determined within the second simulated model basin 610 at approximately a comparable location to the core measurement 250 of FIG. 2 used to derive the comparable sand thickness validation data value 356 of the of the actual basin 202. Thus, the simulation validation values 1114, 1134, 1154 are evaluated at comparable locations on the second simulated basin model result 610 as the associated validation data values 316, 336, 356 were located on the actual basin 202 such that the simulation validation values 1114, 1134, 1154 may use the probability curves 320, 330, 350 calculated for the validation data values 316, 336, 356 of the actual basin 202.

FIG. 11B is an illustration 1110 of determining the probability 1112 for a particular second example interval thickness simulation validation data value 1114 of approximately 22.8 meters. Given the calculated interval thickness validation data probabilistic distribution 320, the value (e.g., 22.8 meters) of the example interval thickness simulation validation data value 1114 found on the second stratigraphic forward model simulation result basin 610 may be used to locate on the interval thickness validation data probabilistic distribution curve 320 the probability 1112 of the example interval thickness validation data value 1114 for a second run of the stratigraphic forward model simulation program. In the example, the probability 1112 is shown to have an approximate value of 0.15.

FIG. 11C is an illustration 1130 of determining the probability for a particular second example porosity simulation validation data value 1134 of approximately 0.36. Given the calculated porosity validation data probabilistic distribution 340, the value (e.g., 0.36) of the example porosity simulation validation data value 1134 found on the second stratigraphic forward model simulation result basin 610 may be used to locate on the porosity validation data probabilistic distribution curve 320 the probability 1132 of the example porosity validation data value 1134 for a second run of the stratigraphic forward model simulation program. In the example, the probability 1132 is shown to have an approximate value of 0.19.

FIG. 11D is an illustration 1150 of determining the probability 1152 for a particular second example sand thickness simulation validation data value 1154 of approximately 6.6 meters. Given the calculated sand thickness validation data probabilistic distribution 350, the value (e.g., 6.6 meters) of the example sand thickness simulation validation data value 1154 found on the second stratigraphic forward model simulation result basin 610 may be used to locate on the sand thickness validation data probabilistic distribution curve 360 the probability 1152 of the example sand thickness validation data value 1154 for a second run of the stratigraphic forward model simulation program. In the example, the probability 1152 is shown to have an approximate value of 0.11.

FIG. 11E is an illustration 1170 of the progression in the calculation 1172 of a product of probabilities 874 for a second example plurality of simulation validation values 1114, 1134, 1154. In looking at the likelihood equation (i.e., Eq. 3 disclosed above), it can be seen that the general product of the probabilities 874 for validation data values is a subset of the overall Eq. 3 (see, for example, Eq. 19 above). Plugging in the probabilities for the example second simulation run of 0.15 for the example second simulation interval thickness validation data value probability 1112, of 0.19 for the example second simulation run porosity validation data value probability 1132, and of 0.11 for the example second simulation run sand thickness validation data value probability 1152, the product of the probabilities 1176 for the example second simulation run from Eq. 19 (874) would be 0.003135.

FIG. 12 is an illustration 1200 of the progression in the calculation 1202 of a likelihood 1210 for a second example simulated model result basin 610. With the likelihood equation of Eq. 3 given above, the likelihood calculation may be reduced to the form of 1274 for the likelihood calculation for the second example simulated model result basin 610. With the product of the probabilities 1076 for the example second simulation run input parameter set and the product of the probabilities 1176 for the example second simulation run plurality of simulation validation data values 1114, 1134, 1154, value of the likelihood calculation for the example second simulation run would be given at 1210 as a value of 0.000176428.

Figure 13:
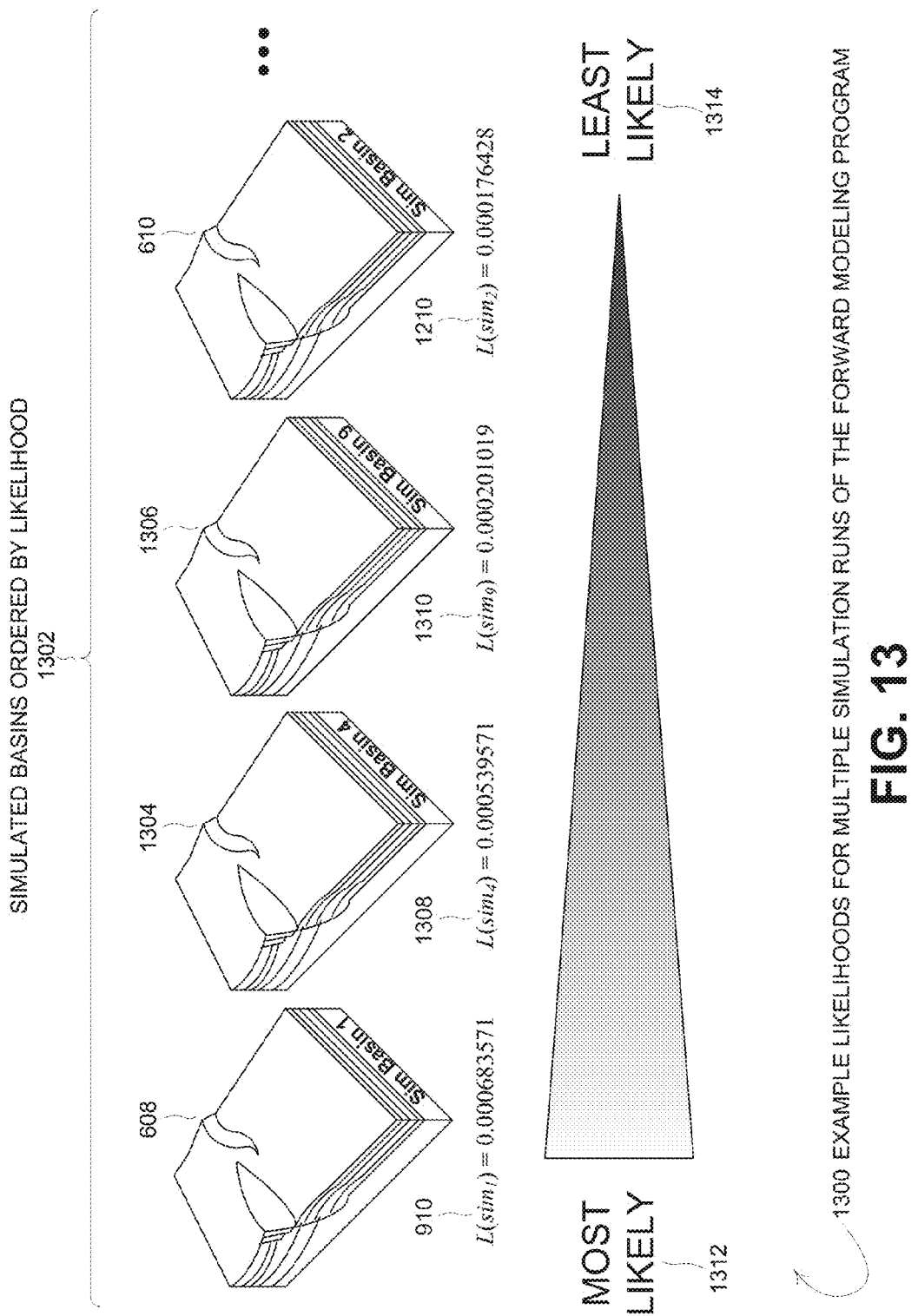
FIG. 13 is a schematic illustration of the ranking of likelihoods calculated for a plurality of runs of an example stratigraphic forward model simulation program.

FIG. 13 is a schematic illustration 1300 of the ranking 1302 of likelihoods 910, 1308, 1310, 1210 calculated for a plurality of runs 608, 1304, 1306, 610 of an example stratigraphic forward model simulation program. As shown in FIG. 13, the simulated model basins 608, 1304, 1306, 610 are listed left to right from most likely 1312 to least likely 1314. While only simulated model basins 1 (910), simulated model basin 4 (1304), simulated model basin 9 (1306), and simulated model basin 2 (610) are shown in FIG. 13, one skilled in the art would understand that still further simulated model basin having lower likelihoods than those 910, 1308, 1310, 610 shown in FIG. 13 would continue onwards to the right for the least likely 1314 of the likelihood ordered 1302 stratigraphic simulation model result basins.

It may be noted that for the example processing of the embodiment described with respect to FIGS. 2-13 above, the unification of the input and output probabilities resulted in the first stratigraphic simulation model basin 608 having a larger likelihood 910 than the second stratigraphic simulation model basin 610 despite the fact that the second stratigraphic simulation model basin 610 had a significantly larger product of the probabilities of the inputs 1076 compared to the first stratigraphic simulation model basin 608 product of the probabilities of the inputs 776, because the first stratigraphic simulation model basin 608 had results 814, 834, 854 that more closely aligned with the validation data values 312, 332, 352 of the actual basin 202 than did the results 1114, 1134, 1154 of the second stratigraphic simulation model basin 610. Thus, it can be seen that the unified approach of an embodiment permits evaluation of the stratigraphic simulation model basin inputs and outputs in single, comprehensive, unified manner.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computerized method performed by a computer system to automatically select most likely simulated basin results produced by a user selected stratigraphic forward model simulation program as a function of available geologic data used to derive a plurality of forward model input parameters for said stratigraphic forward model simulation program and available observed measurements of an actual basin used to derive a plurality of validation data values of said actual basin, said method comprising:
    calculating by said computer system a probability distribution for each of said plurality of validation data values;
    calculating by said computer system a probability distribution for each of said plurality of forward model input parameters;
    creating by said computer system a plurality of forward model input parameter sets by varying each of said plurality of forward model input parameters within a range of each of said plurality of forward model input parameters such that each of said plurality of forward model input parameter sets is unique from other forward model input parameter sets within said plurality of forward model input parameter sets;
    executing by said computer system said stratigraphic forward model simulation program with each forward model parameter set of said plurality of forward model parameter sets in order to obtain a plurality of stratigraphic simulation model results such that each stratigraphic simulation model result of said plurality of stratigraphic simulation model results is uniquely associated with said forward model input parameter set of said plurality of forward model input parameter sets used to obtain each stratigraphic simulation model result;
    evaluating by said computer system each stratigraphic simulation model result of said plurality of stratigraphic simulation model results to obtain a plurality of simulation validation data values for each stratigraphic simulation model result at a location on each stratigraphic simulation model result comparable to said plurality of validation data values of said actual basin;
    determining by said computer system probabilities for each simulation validation data value of each of said plurality of simulation data values for each stratigraphic simulation model result of said plurality of simulation model results based on said calculated probability distribution of each comparable validation data value of said plurality of validation data values of said actual basin;
    determining by said computer system probabilities for each forward model input parameter of said plurality of forward model input parameters of each forward model input parameter set of said plurality of forward model input parameter sets associated with each stratigraphic simulation model result of said plurality of said stratigraphic simulation model results based on said calculated probability distribution of each forward model input parameter of said plurality of forward model input parameters;
    calculating by said computer system a simulation model result likelihood for each stratigraphic simulation model result of said plurality of stratigraphic simulation model results, by combining together said determined probabilities of said plurality of forward model input parameters of said forward model input parameter set associated with each stratigraphic simulation model result to obtain a combination of forward model input parameter probabilities for each stratigraphic simulation model result, combining together said probabilities of said plurality of simulation validation data values associated with each stratigraphic simulation model result to obtain a combination of simulation validation data value probabilities for each stratigraphic simulation model result, and then combining said combination of forward model input parameter probabilities with said combination of simulation validation data value probabilities for each stratigraphic simulation model result to obtain said simulation model result likelihood for each stratigraphic simulation model result; and
    selecting automatically by said computer system at least one stratigraphic simulation model result and associated forward model input parameter set as most likely as a function of said at least one stratigraphic simulation model result having a higher simulation model result likelihood than other stratigraphic simulation model results of said plurality stratigraphic simulation model results.

2. The computerized method of claim 1 wherein said combinations of said process of calculating said simulation model result likelihood for each stratigraphic simulation model result of said plurality of stratigraphic simulation model results are calculated as a multiplicative product such that said calculating by said computer system is accomplished by multiplying together said determined probabilities of said plurality of forward model input parameters of said forward model input parameter set associated with each stratigraphic simulation model result to obtain a product of forward model input parameter probabilities for each stratigraphic simulation model result, multiplying together said probabilities of said plurality of simulation validation data values associated with each stratigraphic simulation model result to obtain a product of simulation validation data value probabilities for each stratigraphic simulation model result, and then multiplying said product of forward model input parameter probabilities with said product of simulation validation data value probabilities for each stratigraphic simulation model result to obtain said simulation model result likelihood for each stratigraphic simulation model result.

3. The computerized method of claim 1 wherein said combinations of said process of calculating said simulation model result likelihood for each stratigraphic simulation model result of said plurality of stratigraphic simulation model results are calculated as an additive summation such that said calculating by said computer system is accomplished by adding together said determined probabilities of said plurality of forward model input parameters of said forward model input parameter set associated with each stratigraphic simulation model result to obtain a sum of forward model input parameter probabilities for each stratigraphic simulation model result, adding together said probabilities of said plurality of simulation validation data values associated with each stratigraphic simulation model result to obtain a sum of simulation validation data value probabilities for each stratigraphic simulation model result, and then adding said sum of forward model input parameter probabilities with said sum of simulation validation data value probabilities for each stratigraphic simulation model result to obtain said simulation model result likelihood for each stratigraphic simulation model result.

4. The computerized method of claim 1 wherein said calculating said simulation model result likelihood for each stratigraphic simulation model result of said plurality of stratigraphic simulation model results further comprises:
  weighting each individual determined probability of said plurality of forward model input parameters of said forward model input parameter set associated with each stratigraphic simulation model result with an associated user entry forward model input parameter weight value; and
  weighting each individual probability of said plurality of simulation validation data values associated with each stratigraphic simulation model result with an associated user entry validation data weight value.

5. The computerized method of claim 1 wherein said selecting automatically at least one stratigraphic simulation model result and associated forward model input parameter set as most likely further comprises:
  selecting automatically by said computer system a stratigraphic simulation model result and associated forward model input parameter set with a highest simulation model result likelihood as a most likely stratigraphic simulation model result.

6. The computerized method of claim 1 wherein said selecting automatically at least one stratigraphic simulation model result and associated forward model input parameter set as most likely further comprises:
  selecting automatically by said computer system each stratigraphic simulation model result that has an associated simulation model result likelihood that exceeds a predefined likelihood threshold value as a suite of most likely stratigraphic simulation model results and associated forward model input parameter sets.

7. The computerized method of claim 6 further comprising:
  calculating by said computer system a probability distribution for said suite of most likely stratigraphic simulation model results and associated forward model input parameter sets by assigning a probability for each stratigraphic simulation model result and associated forward model input parameter set to be equal to said likelihood of each stratigraphic simulation model result and associated forward model input parameter set of said suite of most likely stratigraphic simulation model results and associated forward model input parameter sets divided by a sum of all said likelihoods of said suite said suite of most likely stratigraphic simulation model results and associated forward model input parameter sets.

8. The computerized method of claim 1 wherein said range of each of said plurality of forward model input parameters is set using one of a group of techniques chosen from: automatically setting said range by said computer system as a function of said calculated probability distribution of each of said plurality of forward model input parameters, automatically setting said range by said computer system as a function of a standard deviation (i.e., $\sigma$) of said calculated probability distribution of each of said plurality of forward model input parameters, automatically setting said range by said computer system as plus or minus two of said standard deviations (i.e., +/−2$\sigma$'s) of said calculated probability distribution of each of said plurality of forward model input parameters, and setting said range as a user data entry value.

9. The computerized method of claim 1 wherein said creating by said computer system said plurality of forward model input parameter sets by varying each of said plurality of forward model input parameters within said range of each of said plurality of forward model input parameters further comprises incrementing at a sampling step value for each of said forward model input parameters within said range of each of said plurality of forward model input parameters such that said sampling step value for each of said forward model input parameters is set using one of a group of techniques chosen from: automatically setting said sampling step value by said computer system as a fraction of a total width of said range of each of said plurality of forward model input parameters, and setting said sampling step value as a user data entry value.

10. The computerized method of claim 1 wherein said creating said plurality of forward model input parameter sets by varying each of said plurality of forward model input parameters within said range of each of said plurality of forward model input parameters further comprises:
  creating a forward model input parameter set for substantially all potential parameter sets that fall within said range of each of said forward model input parameters and that are incremented at a predefined sampling step value for each of said forward model input parameters.

11. The computerized method of claim 10 wherein said creating a forward model input parameter set for substantially all potential parameter sets is performed by said computer system using one of a group of techniques chosen from: Monte Carlo simulation, and frequency distribution plots.

12. The computerized method of claim 1 wherein said creating said plurality of forward model input parameter sets by varying each of said plurality of forward model input parameters within said range of each of said plurality of forward model input parameters further comprises:
  creating forward model input parameter sets for forward input parameter using a standard optimization method to select forward model input parameter values for each forward model input parameter set of said plurality of forward model input parameter sets in order to reduce a total number of forward model input parameter sets of said plurality of input parameter sets executed by said stratigraphic forward model simulation program.

13. A simulated basin result selection computer system that automatically selects most likely simulated basin results produced by a user selected stratigraphic forward model simulation program based as a function of available geologic data used to derive a plurality of forward model input parameters for said stratigraphic forward model simulation program and available observed measurements of an actual basin used to derive a plurality of validation data values of said actual basin, said simulated basin result selection computer system comprising:
  a computer system, said computer system control and management function operation directed by computer instructions of an application operating on said computer system such that said computer system directed by said application further comprises:
- a validation data probability distribution calculation subsystem that calculates a probability distribution for each of said plurality of validation data values;
- a forward model input parameter probability distribution calculation subsystem that calculates a probability distribution for each of said plurality of forward model input parameters;
- a forward model input parameter set creation subsystem that creates a plurality of forward model input parameter sets by varying each of said plurality of forward model input parameters within a range of each of said plurality of forward model input parameters such that each of said plurality of forward model input parameter sets is unique from other forward model input parameter sets within said plurality of forward model input parameter sets;
- a stratigraphic forward model simulation program execution subsystem that executes said stratigraphic forward model simulation program with each forward model parameter set of said plurality of forward model parameter sets in order to obtain a plurality of stratigraphic simulation model results such that each stratigraphic simulation model result of said plurality of stratigraphic simulation model results is uniquely associated with said forward model input parameter set of said plurality of forward model input parameter sets used to obtain each stratigraphic simulation model result;
- a stratigraphic simulation model result evaluation subsystem that evaluates each stratigraphic simulation model result of said plurality of stratigraphic simulation model results to obtain a plurality of simulation validation data values for each stratigraphic simulation model result at a location on each stratigraphic simulation model result comparable to said plurality of validation data values of said actual basin;
- a simulation validation data value probability determination subsystem that determines probabilities for each simulation validation data value of each of said plurality of simulation data values for each stratigraphic simulation model result of said plurality of simulation model results based on said calculated probability distribution of each comparable validation data value of said plurality of validation data values of said actual basin;
- a simulation forward model input parameter probability determination subsystem that determines probabilities for each forward model input parameter of said plurality of forward model input parameters of each forward model input parameter set of said plurality of forward model input parameter sets associated with each stratigraphic simulation model result of said plurality of said stratigraphic simulation model results based on said calculated probability distribution of each forward model input parameter of said plurality of forward model input parameters;
- a simulation model result calculation subsystem that calculates a simulation model result likelihood for each stratigraphic simulation model result of said plurality of stratigraphic simulation model results, by combining together said determined probabilities of said plurality of forward model input parameters of said forward model input parameter set associated with each stratigraphic simulation model result to obtain a combination of forward model input parameter probabilities for each stratigraphic simulation model result, combining together said probabilities of said plurality of simulation validation data values associated with each stratigraphic simulation model result to obtain a combination of simulation validation data value probabilities for each stratigraphic simulation model result, and then combining said combination of forward model input parameter probabilities with said combination of simulation validation data value probabilities for each stratigraphic simulation model result to obtain said simulation model result likelihood for each stratigraphic simulation model result; and
- a most likely stratigraphic simulation model result selection subsystem that automatically selects at least one stratigraphic simulation model result and associated forward model input parameter set as most likely as a function of said at least one stratigraphic simulation model result having a higher simulation model result likelihood than other stratigraphic simulation model results of said plurality stratigraphic simulation model results.

14. The simulated basin result selection computer system of claim 13 wherein said simulation model result calculation subsystem combinations of said calculation of said simulation model result likelihood for each stratigraphic simulation model result of said plurality of stratigraphic simulation model results are calculated as a multiplicative product such that said calculation is accomplished by multiplying together said determined probabilities of said plurality of forward model input parameters of said forward model input parameter set associated with each stratigraphic simulation model result to obtain a product of forward model input parameter probabilities for each stratigraphic simulation model result, multiplying together said probabilities of said plurality of simulation validation data values associated with each stratigraphic simulation model result to obtain a product of simulation validation data value probabilities for each stratigraphic simulation model result, and then multiplying said product of forward model input parameter probabilities with said product of simulation validation data value probabilities for each stratigraphic simulation model result to obtain said simulation model result likelihood for each stratigraphic simulation model result.

15. The simulated basin result selection computer system of claim 13 wherein said simulation model result calculation subsystem combinations of said calculation of said simulation model result likelihood for each stratigraphic simulation model result of said plurality of stratigraphic simulation model results are calculated as an additive summation such that said calculation is accomplished by adding together said determined probabilities of said plurality of forward model input parameters of said forward model input parameter set associated with each stratigraphic simulation model result to obtain a sum of forward model input parameter probabilities for each stratigraphic simulation model result, adding together said probabilities of said plurality of simulation validation data values associated with each stratigraphic simulation model result to obtain a sum of simulation validation data value probabilities for each stratigraphic simulation model result, and then adding said sum of forward model input parameter probabilities with said sum of simulation validation data value probabilities for each stratigraphic simulation model result to obtain said simulation model result likelihood for each stratigraphic simulation model result.

16. The simulated basin result selection computer system of claim 13 wherein said simulation model result calculation subsystem further weights each individual determined probability of said plurality of forward model input parameters of said forward model input parameter set associated with each stratigraphic simulation model result with an associated user entry forward model input parameter weight value, and weights each individual probability of said plurality of simulation validation data values associated with each stratigraphic simulation model result with an associated user entry validation data weight value.

17. The simulated basin result selection computer system of claim 13 wherein said most likely stratigraphic simulation model result selection subsystem further automatically selects a stratigraphic simulation model result and associated forward model input parameter set with a highest simulation model result likelihood as a most likely stratigraphic simulation model result.

18. The simulated basin result selection computer system of claim 13 wherein selecting automatically by said computer system a stratigraphic simulation model result and associated forward model input parameter set with a highest simulation model result likelihood as a most likely stratigraphic simulation model result further automatically selects each stratigraphic simulation model result that has an associated simulation model result likelihood that exceeds a predefined likelihood threshold value as a suite of most likely stratigraphic simulation model results and associated forward model input parameter sets.

19. The simulated basin result selection computer system of claim 18 further comprising:
  a stratigraphic simulation model result probability calculation subsystem that calculates a probability distribution for said suite of most likely stratigraphic simulation model results and associated forward model input parameter sets by assigning a probability for each stratigraphic simulation model result and associated forward model input parameter set to be equal to said likelihood of each stratigraphic simulation model result and associated forward model input parameter set of said suite of most likely stratigraphic simulation model results and associated forward model input parameter sets divided by a sum of all said likelihoods of said suite said suite of most likely stratigraphic simulation model results and associated forward model input parameter sets.

20. The simulated basin result selection computer system of claim 13 wherein said range of each of said plurality of forward model input parameters is set using one of a group of techniques chosen from: a range set subsystem that automatically sets said range as a function of said calculated probability distribution of each of said plurality of forward model input parameters, a range set subsystem that automatically sets said range as a function of a standard deviation (i.e., σ) of said calculated probability distribution of each of said plurality of forward model input parameters, a range set subsystem that automatically sets said range as plus or minus two of said standard deviations (i.e., +/−2σ's) of said calculated probability distribution of each of said plurality of forward model input parameters, and a range set subsystem that sets said range as a user data entry value.

21. The simulated basin result selection computer system of claim 13 wherein said forward model input parameter set creation subsystem further increments at a sampling step value for each of said forward model input parameters within said range of each of said plurality of forward model input parameters such that said sampling step value for each of said forward model input parameters is set using one of a group of techniques chosen from: a sampling step size set subsystem that automatically sets said sampling step value as a fraction of a total width of said range of each of said plurality of forward model input parameters, and a sampling step size set subsystem that sets said sampling step value as a user data entry value.

22. The simulated basin result selection computer system of claim 13 wherein said forward model input parameter set creation subsystem further creates a forward model input parameter set for substantially all potential parameter sets that fall within said range of each of said forward model input parameters and that are incremented at a predefined sampling step value for each of said forward model input parameters.

23. The simulated basin result selection computer system of claim 13 wherein said forward model input parameter set creation subsystem further creates forward model input parameter sets for forward input parameter using a standard optimization method to select forward model input parameter values for each forward model input parameter set of said plurality of forward model input parameter sets in order to reduce a total number of forward model input parameter sets of said plurality of input parameter sets executed by said stratigraphic forward model simulation program.

* * * * *